US012234368B2

(12) United States Patent
Swogger et al.

(10) Patent No.: US 12,234,368 B2
(45) Date of Patent: Feb. 25, 2025

(54) DISPERSIONS COMPRISING HIGH SURFACE AREA NANOTUBES AND DISCRETE CARBON NANOTUBES

(71) Applicant: MOLECULAR REBAR DESIGN, LLC, Austin, TX (US)

(72) Inventors: Kurt W. Swogger, Austin, TX (US); Clive P. Bosnyak, Dripping Springs, TX (US); Malcolm Francis Finlayson, Houston, TX (US); Jerry Gazda, Austin, TX (US); Vinay Bhat, Austin, TX (US); Nancy Henderson, Austin, TX (US); Emily Barton Cole, Austin, TX (US)

(73) Assignee: MOLECULAR REBAR DESIGN, LLC

( * ) Notice: Subject to any disclaimer, the term of this patent is extended or adjusted under 35 U.S.C. 154(b) by 877 days.

(21) Appl. No.: 17/187,658

(22) Filed: Feb. 26, 2021

(65) Prior Publication Data
US 2021/0179880 A1 Jun. 17, 2021

Related U.S. Application Data

(63) Continuation-in-part of application No. 16/012,265, filed on Jun. 19, 2018, now Pat. No. 10,934,447.
(Continued)

(51) Int. Cl.
*C09D 11/52* (2014.01)
*B60C 1/00* (2006.01)
*B82Y 30/00* (2011.01)
*B82Y 40/00* (2011.01)
*C01B 32/158* (2017.01)
(Continued)

(52) U.S. Cl.
CPC .............. *C09D 11/52* (2013.01); *B60C 1/00* (2013.01); *B82Y 30/00* (2013.01); *B82Y 40/00* (2013.01); *C01B 32/158* (2017.08); *C01B 32/174* (2017.08); *C08C 1/14* (2013.01); *C08J 3/2053* (2013.01); *C09C 1/44* (2013.01); *C09D 5/24* (2013.01); *C09D 7/45* (2018.01); *C09D 7/62* (2018.01); *C09D 11/03* (2013.01); *C09D 11/033* (2013.01); *C09K 23/002* (2022.01); *C01B 2202/06* (2013.01); *C01B 2202/20* (2013.01); *C01B 2202/22* (2013.01); *C01B 2202/36* (2013.01); *C01P 2004/13* (2013.01); *C01P 2004/54* (2013.01); *C08J 2321/02* (2013.01); *C08K 3/041* (2017.05); *C08K 2201/011* (2013.01); *C08K 2201/016* (2013.01); *C08L 7/00* (2013.01); *C08L 9/06* (2013.01); *C08L 9/08* (2013.01); *Y10S 977/734* (2013.01); *Y10S 977/753* (2013.01); *Y10S 977/842* (2013.01);
(Continued)

(58) Field of Classification Search
CPC . C09D 11/52; C09D 7/45; C09D 7/62; C09D 5/24; C09D 11/03; C09D 11/033; C01B 32/174; C01B 32/158; C01B 2202/06; C01B 2202/20; C01B 2202/22; C01B 2202/36; C09K 23/002; B60C 1/00; B82Y 30/00; B82Y 40/00; C80C 1/14; C08J 3/2053; C08J 2321/02; C09C 1/44; C08K 3/041; C08K 2201/011; C08K 2201/016; C01P 2004/13; C01P 2004/54; C08L 7/00; C08L 9/06; C08L 9/08; Y10S 977/734; Y10S 977/753; Y10S 977/842; Y10S 977/892; Y10S 977/932
USPC ........................................................ 524/495
See application file for complete search history.

(56) References Cited

U.S. PATENT DOCUMENTS 3,471,395 A 10/1969 Summer
4,421,878 A 12/1983 Close
(Continued)

FOREIGN PATENT DOCUMENTS

CN 1402888 A 3/2003
EP 2139630 B1 1/2010
(Continued)

OTHER PUBLICATIONS

Chaturvedi, Poornendu et al., "Carbon Nanotube-Purification and Sorting Protocols" Defence Science Journal, vol. 58, No. 5, Sep. 2008, pp. 591-599.
(Continued)

*Primary Examiner* — Ling Siu Choi
*Assistant Examiner* — Ronald Grinsted
(74) *Attorney, Agent, or Firm* — Hunton Andrews Kurth LLP

(57) ABSTRACT

The present application pertains to dispersions comprising oxidized, discrete carbon nanotubes and high-surface area carbon nanotubes. The oxidized, discrete carbon nanotubes comprise an interior and exterior surface, each surface comprising an interior surface oxidized species content and an exterior surface oxidized species content. The interior surface oxidized species content differs from the exterior surface oxidized species content by at least 20%, and as high as 100%. The high-surface area nanotubes are generally single-wall nanotubes. The BET surface area of the high-surface area nanotubes is from about 550 $m^2/g$ to about 1500 $m^2/g$ according to ASTM D6556-16. The aspect ratio is at least about 500 up to about 6000. The dispersions comprise from about 0.1 to about 30% by weight nanotubes based on the total weight of the dispersion.

21 Claims, 12 Drawing Sheets

Related U.S. Application Data which is a continuation-in-part of application No. 15/840,174, filed on Dec. 13, 2017, now Pat. No. 10,000,653, which is a continuation of application No. 15/496,721, filed on Apr. 25, 2017, now abandoned, which is a continuation-in-part of application No. 15/288,553, filed on Oct. 7, 2016, now Pat. No. 9,636,649, which is a continuation-in-part of application No. 15/225,215, filed on Aug. 1, 2016, now Pat. No. 9,493,626, which is a continuation-in-part of application No. 15/166,931, filed on May 27, 2016, now Pat. No. 9,422,413, which is a continuation of application No. 14/924,246, filed on Oct. 27, 2015, now Pat. No. 9,353,240, which is a continuation of application No. 13/993,206, filed as application No. PCT/EP2011/072427 on Dec. 12, 2011, now Pat. No. 9,212,273.

(60) Provisional application No. 61/423,033, filed on Dec. 14, 2010.

(51) Int. Cl.

| | | |
|---|---|---|
| *C01B 32/174* | (2017.01) | |
| *C08C 1/14* | (2006.01) | |
| *C08J 3/205* | (2006.01) | |
| *C09C 1/44* | (2006.01) | |
| *C09D 5/24* | (2006.01) | |
| *C09D 7/45* | (2018.01) | |
| *C09D 7/62* | (2018.01) | |
| *C09D 11/03* | (2014.01) | |
| *C09D 11/033* | (2014.01) | |
| *C09K 23/00* | (2022.01) | |
| *C08K 3/04* | (2006.01) | |
| *C08L 7/00* | (2006.01) | |
| *C08L 9/06* | (2006.01) | |
| *C08L 9/08* | (2006.01) | |

(52) U.S. Cl.
CPC ........ *Y10S 977/892* (2013.01); *Y10S 977/932* (2013.01)

(56) References Cited

U.S. PATENT DOCUMENTS

| | | | |
|---|---|---|---|
| 4,625,761 | A | 12/1986 | Uchida |
| 5,079,123 | A | 1/1992 | Nanya |
| 5,458,681 | A | 10/1995 | Hasegawa |
| 5,750,304 | A | 5/1998 | Yamaguchi |
| 6,544,326 | B1 | 4/2003 | Itou |
| 6,569,231 | B1 | 5/2003 | Mathias |
| 6,783,746 | B1 | 8/2004 | Zhang et al. |
| 7,091,120 | B2 | 8/2006 | Buretea |
| 7,163,973 | B2 | 1/2007 | Ahsan |
| 7,601,421 | B2 | 10/2009 | Khabashesku et al. |
| 7,749,682 | B2 | 7/2010 | Miyabe |
| 7,763,229 | B2 | 7/2010 | Nikolaev et al. |
| 7,807,127 | B1 | 10/2010 | Forohar |
| 7,846,998 | B2 | 12/2010 | Akagi |
| 7,959,280 | B2 | 6/2011 | Koike |
| 8,282,725 | B2 | 10/2012 | Shimomura |
| 9,327,054 | B2 | 5/2016 | Sundara |
| 9,636,649 | B2 | 5/2017 | Bosnyak et al. |
| 10,000,653 | B2 | 6/2018 | Swogger et al. |
| 2003/0049443 | A1 | 3/2003 | Nishimura et al. |
| 2003/0213939 | A1 | 11/2003 | Narayan |
| 2006/0014873 | A1 | 1/2006 | Ikezawa |
| 2006/0124028 | A1 | 6/2006 | Huang |
| 2007/0259994 | A1 | 11/2007 | Tour |
| 2008/0315453 | A1 | 12/2008 | Molitor |
| 2009/0168301 | A1 | 7/2009 | Viswanathan |
| 2009/0200517 | A1 | 8/2009 | El Bounia |
| 2010/0004468 | A1 | 1/2010 | Wong et al. |
| 2010/0006152 | A1 | 1/2010 | Hatton |
| 2010/0009165 | A1 | 1/2010 | Patel |
| 2010/0016473 | A1 | 1/2010 | Kaji |
| 2010/0122642 | A1* | 5/2010 | Farrugia ............... C09D 11/101 977/902 |
| 2010/0124713 | A1 | 5/2010 | Farrugia |
| 2010/0197832 | A1 | 8/2010 | Sun |
| 2010/0267883 | A1 | 10/2010 | Bhatt |
| 2011/0183253 | A1 | 7/2011 | Aga |
| 2011/0272856 | A1 | 11/2011 | Rasmussen |
| 2012/0035309 | A1 | 2/2012 | Zhu et al. |
| 2012/0058255 | A1 | 3/2012 | Gan |
| 2012/0183770 | A1 | 7/2012 | Bosnyak et al. |
| 2017/0050158 | A1 | 2/2017 | Bosnyak et al. |
| 2018/0298221 | A1 | 10/2018 | Swogger et al. |
| 2019/0161350 | A1 | 5/2019 | Swogger et al. |
| 2020/0018535 | A1 | 1/2020 | Leal et al. |
| 2020/0198973 | A1 | 6/2020 | Swogger et al. |
| 2020/0369522 | A1 | 11/2020 | Finlayson et al. |
| 2021/0179880 | A1 | 6/2021 | Swogger et al. |
| 2021/0237509 | A1 | 8/2021 | Bosnyak et al. |

FOREIGN PATENT DOCUMENTS

| | | |
|---|---|---|
| JP | 2009-235650 A | 10/2009 |
| KR | 10-2008-0111488 | 12/2008 |
| WO | 200135473 A1 | 5/2001 |
| WO | 2008054845 A2 | 5/2008 |
| WO | 2008067137 A2 | 6/2008 |
| WO | 2011163129 A2 | 12/2011 |

OTHER PUBLICATIONS

Kim, Dong Sik et al., Individualization of Single-walled Carbon Nanotubes: Is the Solvent Important? Small, 2005, 1, No. 11, pp. 1117-1124.

International Search Report and Written Opinion dated Aug. 2, 2022 issued in PCT/US2022/21737 filed on Mar. 24, 2022.

International Search Report and Written Opinion dated May 3, 2022 issued in International Application No. PCT/US2022/017992.

J. Mijovic, E. M. Pearce, and C.-C. Foun. "Fluoroelastomer Modified Thermoset Resins." Advances in Chemistry; American Chemical Society 1984, 293-307.

P. C. Hiemenz, T.P. Lodge. "Polymer Chemistry, Second Edition." CRC Press 2007. Chapters 2 and 10.

B.D. Cullity. "Elements of X-Ray Diffraction." Addison-Wesley Publishing Company, Inc. 1978. p. 86-87.

J.E. Plevyak and L.A. Sobieski. "Improved RIM Processing with Silicone Internal Mold Release Technology." Journal of Cellular Plastics 1984, 363-368.

N. Canter. "Mold-release agents and coatings." Tribology & Lubrication Technology 2008, 31-38.

A. Hirsch. "Functionalization of Single-Walled Carbon Nanotubes" Angew. Chem. Int. Ed. 2002, 41, No. 11, 1853-1859.

"The IUPAC Rules for Naming Organic Molecules" Stanislaw Skonieczny. Journal of Chemical Education. vol. 83 No. 11, pp. 1633-1637 (2006) ("Skonieczny").

"Characterization of Zirconium Phosphate/Polycation Thin Films Grown by Sequential Adsorption Reactions" Hyuk-Nyun Kim, Steven W. Keller, Thomas E. Mallouk, Johannes Schmitt, and Gero Decher. Chem. Mater., vol. 9, No. 6, 1997.

"Sonochemical Oxidation of Multiwalled Carbon Nanotubes." Yangchuan Xing, Liang Li, Charles C. Chusuei, and Robert V. Hull. Langmuir 2005, 21, 4185-4190.

"Surface modified multi-walled carbon nanotubes in CNT/epoxycomposites." Florian H. Gojny, Jacek Nastalczyk, Zbigniew Roslaniec, Karl Schulte. Chemical Physics Letters 370 (2003) 820-824.

Peddini S.K. et al., Nanocomposites from styrene-butadiene rubber (SBR) and multiwall carbon nanotubes (MWCNT) part 1: Morphology and rheology, Polymer 55 (2014) pp. 258-270.

(56) References Cited

OTHER PUBLICATIONS

Datsyuk V. et al., Chemical oxidation of multiwalled carbon nanotubes, Carbon 46 (2008) pp. 833-840.

* cited by examiner 0.8% MR /0.02% Oxidized OCSiAl

DISPERSIONS COMPRISING HIGH SURFACE AREA NANOTUBES AND DISCRETE CARBON NANOTUBES

CROSS-REFERENCES

This application is a continuation-in-part application of U.S. Ser. No. 16/012,265 filed Jun. 19, 2018 and issuing on Mar. 2, 2021 as U.S. Pat. No. 10,934,447. U.S. Ser. No. 16/012,265 is a continuation-in-part application of U.S. Ser. No. 15/840,174, filed on Dec. 13, 2017, and allowed on Apr. 11, 2018, and issuing as U.S. Pat. No. 10,000,653, which is a continuation of U.S. Ser. No. 15/496,721, filed Apr. 25, 2017, abandoned, which was a continuation-in-part application of U.S. Ser. No. 15/288,553 filed Oct. 7, 2016 and allowed Mar. 21, 2017 to be issued as U.S. Pat. No. 9,636,649, which was a continuation-in-part application of U.S. Ser. No. 15/225,215 filed Aug. 1, 2016, allowed Sep. 12, 2016 and issued as U.S. Pat. No. 9,493,626 which was a continuation-in-part application of U.S. Ser. No. 15/166,931 filed May 27, 2016 and issued as U.S. Pat. No. 9,422,413 which was a continuation of U.S. Ser. No. 14/924,246, filed Oct. 27, 2015 and issued as U.S. Pat. No. 9,353,240, which is a continuation of U.S. Ser. No. 13/993,206, filed Jun. 11, 2013 and issued as U.S. Pat. No. 9,212,273, which claims priority to PCT/EP2011/072427, filed Dec. 12, 2011, which claims benefit of U.S. provisional application 61/423,033, filed Dec. 14, 2010. All of the afore-mentioned U.S. applications and/or granted patents are expressly incorporated herein by reference. This application is also related to U.S. Ser. Nos. 62/319,599; 14/585,730; 14/628,248; and Ser. No. 14/963,845. This application also claims priority to Ser. No. 16/420,762 filed on May 23, 2019 and Ser. No. 17/080,280 filed Oct. 26, 2020 which applications are incorporated herein by reference.

FIELD OF INVENTION

The present invention is directed to novel compositions and methods for producing dispersions of high surface area nanotubes and discrete carbon nanotubes.

BACKGROUND AND SUMMARY OF THE INVENTION

Carbon nanotubes can be classified by the number of walls in the tube, single-wall, double wall and multiwall. Each wall of a carbon nanotube can be further classified into chiral or non-chiral forms. Carbon nanotubes are currently manufactured as agglomerated nanotube balls or bundles. Use of carbon nanotubes as a reinforcing agent in polymer composites is an area in which carbon nanotubes are predicted to have significant utility. However, utilization of carbon nanotubes in these applications has been hampered due to the general inability to reliably produce individualized carbon nanotubes. To reach the full potential of performance enhancement of carbon nanotubes as composites in polymers the aspect ratio, that is length to diameter ratio, should be substantially greater than 40. The maximum aspect ratio for a given tube length is reached when each tube is fully separated from another. A bundle of carbon nanotubes, for example, has an effective aspect ratio in composites of the average length of the bundle divided by the bundle diameter.

Various methods have been developed to debundle or disentangle carbon nanotubes in solution. For example, carbon nanotubes may be shortened extensively by aggressive oxidative means and then dispersed as individual nanotubes in dilute solution. These tubes have low aspect ratios not suitable for high strength composite materials. Carbon nanotubes may also be dispersed in very dilute solution as individuals by sonication in the presence of a surfactant. Illustrative surfactants used for dispersing carbon nanotubes in aqueous solution include, for example, sodium dodecyl sulfate, or cetyltrimethyl ammonium bromide. In some instances, solutions of individualized carbon nanotubes may be prepared from polymer-wrapped carbon nanotubes. Individualized single-wall carbon nanotube solutions have also been prepared in very dilute solutions using polysaccharides, polypeptides, water-soluble polymers, nucleic acids, DNA, polynucleotides, polyimides, and polyvinylpyrrolidone. The dilution ranges are often in the mg/liter ranges and not suitable for commercial usage.

Coatings comprising dispersed carbon nanotubes and epoxy are highly desirable, especially in weather exposure conditions. Such conditions include salt water contact and/or high ultraviolet (UV) exposure.

Essential to the aforementioned products is their generally high degree of distribution. The materials and processes used must therefore enable the resulting component to be produced at the lowest possible costs in order to meet the high demand cheaply. Processes that make this possible.

A prerequisite for the good contact and adhesion of the coatings is a fine dispersion of the epoxy particles in the formulations used for the coating in each case.

The present invention relates to an epoxy dispersion suitable for coatings. In one embodiment, the dispersion comprises at least one epoxy resin and a plurality of oxidized, discrete carbon nanotubes, wherein the discrete carbon nanotubes comprise an interior and exterior surface, each surface comprising an interior surface oxidized species content and an exterior surface oxidized species content, wherein the interior surface oxidized species content differs from the exterior surface oxidized species content by at least 20%, and as high as 100% and are present in the range of from about 0.1 to about 30% by weight based on the total weight of the dispersion.

Preferably, the dispersion comprises an interior surface oxidized species content less than the exterior surface oxidized species content.

The dispersion can comprise an interior surface oxidized species content up to 3 weight percent relative to carbon nanotube weight, preferably from about 0.01 to about 3 weight percent relative to carbon nanotube weight, more preferably from about 0.01 to about 2, most preferably from about 0.01 to about 1.

The discrete carbon nanotubes of the dispersions preferably have an aspect ratio that is bimodal.

The dispersion can further comprise at least one epoxy resin diluent, preferably wherein the epoxy resin diluent is selected from the group consisting of a diglycidyl ether of cis-1,3-cyclohexanedimethanol, a diglycidyl ether of trans-1,3-cyclohexanedimethanol, a diglycidyl ether of cis-1,4-cyclohexanedimethanol, a diglycidyl ether of trans-1,4-cyclohexanedimethanol, a monoglycidyl ether of cis-1,3-cyclohexanedimethanol, a monoglycidyl ether of trans-1,3-cyclohexanedimethanol, a monoglycidyl ether of cis-1,4-cyclohexanedimethanol, a monoglycidyl ether of trans-1,4-cyclohexanedimethanol, one or more oligomers thereof, and mixtures thereof.

The dispersions can further comprise a compound comprising zinc, phosphate, chromate, phosphosilicate, borosilicate, borate, nitrate, or mixtures thereof, especially wherein the compound comprising zinc is selected from the group consisting of zinc, zinc-oxide, zinc-hydroxide, zinc-sulfide, zinc-selenide, zinc-telluride, zinc-salts, and mixtures thereof.

Preferably the compound comprising zinc is present in the range from about 0.1% to about 30% by weight based on the total weight of the dispersion.

The discrete carbon nanotubes in the dispersion can have an aspect ratio of 25 to 500.

Preferably at least 70 percent by weight of the carbon nanotubes in the dispersions are discrete.

The dispersions can further comprise at least one dispersant, preferably wherein the dispersant is selected from the group consisting of hydrophobic polymers, anionic polymers, non-ionic polymers, cationic polymers, ethylene oxide containing polymers, propylene oxide containing polymers, amphiphilic polymers, fatty acids, and mixtures thereof.

The dispersions can further comprise an additive selected from the group consisting of an epoxy resin diluent, a compound comprising zinc, a dispersant, and mixtures thereof.

Preferably at least a portion of the oxidized, discrete carbon nanotubes of the dispersions comprise an oxidation species selected from carboxylic acid or a derivative carbonyl containing species wherein the derivative carbonyl species is selected from ketones, quaternary amines, amides, esters, acyl halogens, and metal salt, preferably wherein the oxidized, discrete carbon nanotubes comprise an oxidation species selected from hydroxyl or derived from hydroxyl containing species.

The dispersions can further comprise an acrylic polymer, a silicone polymer, or a mixture thereof.

The plurality of oxidized, discrete carbon nanotubes of the dispersions preferably comprise multiwall carbon nanotubes.

The dispersions can further comprise at least one organic inhibitor selected from the group consisting of azoles, calcium alkyl-aryl sulfonates, diamines, and metal salts of dinonylnapathalene sulphonates.

Another embodiment of the invention comprises a catheter comprising the dispersions, wherein the epoxy has been at least partially cured.

Another embodiment of the inventions comprises a coating comprising the dispersions, wherein the epoxy has been at least partially cured.

Yet another embodiment of the invention is a composition comprising a plurality of discrete carbon nanotube fibers having an aspect ratio of from about 25 to about 500, and at least one natural or synthetic elastomer, and optionally at least one filler. The composition can have carbon nanotube fibers with an oxidation level of from about 3 weight percent to about 15 weight percent, or from about 0.5 weight percent up to about 4, or up to about 3, or up to 2 weight percent based on the total weight of discrete carbon nanotubes. The carbon nanotube fibers comprise preferably of about 1 weight percent to about 30 weight percent of the composition and the composition is in the form of free flowing particles or a bale. The composition is further comprising of at least one surfactant or dispersing aid. The composition can comprise the natural or synthetic elastomer selected from the group consisting of, but not limited to, natural rubbers, polyisobutylene, polybutadiene and styrene-butadiene rubber, butyl rubber, polyisoprene, styrene-isoprene rubbers, styrene-isoprene rubbers, ethylene propylene diene rubbers, silicones, polyurethanes, polyester-polyethers, hydrogenated and non-hydrogenated nitrile rubbers, halogen modified elastomers, flouro-elastomers, and combinations thereof. The composition contains fibers that are not entangled as a mass and are uniformly dispersed in the elastomer.

In another embodiment, the invention is a process to form a carbon nanotube fiber/elastomer composite comprising the steps of: (a) selecting discrete carbon nanotube fibers having an aspect ratio of from 25 to 500, (b) blending the fibers with a liquid to form a liquid/fiber mixture, (c) optionally adjusting the pH to a desired level, (d) agitating the mixture to a degree sufficient to disperse the fibers to form a dispersed fiber mixture, (e) optionally combining the dispersed fiber mixture with at least one surfactant, (f) combining the dispersed fiber mixture with at least one elastomer at a temperature sufficient to incorporate the dispersed fiber mixture to form a carbon nanotube fiber/elastomer composite/liquid mixture, (g) isolating the resulting carbon nanotube fiber/elastomer composite from the liquid. The carbon nanotube fibers comprise from about 1 to about 30 weight percent of the fiber/elastomer composite of (g). The liquid is aqueous based. The agitating step (d) comprises sonication. In this embodiment, the elastomer is selected from, but not limited to, the natural or synthetic elastomer selected from the group consisting of, but not limited to, natural rubbers, polyisobutylene, polybutadiene and styrene-butadiene rubber, butyl rubber, polyisoprene, styrene-isoprene rubbers, styrene-isoprene rubbers, ethylene propylene diene rubbers, silicones, polyurethanes, polyester-polyethers, hydrogenated and non-hydrogenated nitrile rubbers, halogen modified elastomers, fluoro-elastomers, and combinations thereof. The composition is further comprising sufficient natural or synthetic elastomer to form a formulation comprising from about 0.1 to about 25 weight percent carbon nanotube fibers.

In another embodiment, the invention is a formulation in the form of a molded or fabricated article, such as a tire, a hose, a belt, a seal and a tank track pad, wheel, bushings or backer plate components.

In another embodiment, the invention is a nanotubes/elastomer composite further comprising of filler or fillers such as carbon black and/or silica, and wherein a molded film comprising the composition has a tensile modulus at 5 percent strain of at least about 12 MPa. The composition comprising of carbon black, and wherein a molded film comprising the composition has a tear property of at least about 0.8 MPa.

In yet another embodiment of the invention is a carbon nanotube/elastomer composition further comprising of filler, and where in a molded film comprising the composition has a tensile modulus at 5% strain of at least 8 MPa.

In yet another embodiment of the invention is a carbon nanotube fiber/elastomer composite, wherein the carbon nanotube fibers are discrete fibers and comprise from about 10 to about 20 weight percent fibers and wherein the elastomer comprises a styrene copolymer rubber.

In still another embodiment of the invention is a method for obtaining individually dispersed carbon nanotubes in rubbers and/or elastomers comprising (a) forming a solution of exfoliated carbon nanotubes at pH greater than or equal to about 7, (b) adding the solution to a rubber or elastomer latex to form a mixture at pH greater than or equal to about 7, (c) coagulating the mixture to form a concentrate, (d) optionally incorporating other fillers into the concentrate, and (e) melt-mixing said concentrate into rubbers and/or elastomers to form elastomeric composites. In this embodiment the carbon nanotubes comprise less than or equal to about 2 percent by weight of the solution. A further embodiment is that the coagulation step comprises mixing with acetone. In another embodiment, the coagulation step comprises drying the mixture. In yet another embodiment the coagulation step comprises adding at least one acid to the mixture at pH less than or equal to about 4.5 together with at least one monovalent inorganic salt. In another embodiment, the mixture has divalent or multivalent metal ion content of less than about 20,000 parts per million, preferably less than about 10,000 parts per million and most preferably less than about 1,000 parts per million.

Another aspect of this invention are coagulating methods/ agents are those that enable the carbon nanotube to be non-ordered on the surface of the elastomer latex particle and together are substantially removable from the liquid mixture. A further aspect of this invention is a method to reduce or remove surfactants in the latex/carbon nanotube fiber composite system organic molecules of high water solubility such as acetone, denatured alcohol, ethyl alcohol, methanol, acetic acid, tetrahydrofuran. Another aspect of this invention is to select coagulating methods that retain surfactant in the latex/carbon nanotube fiber material which includes coagulating methods such as sulfuric acid and inorganic monovalent element salt mixtures, acetic acid and monovalent element salt mixtures, formic acid and inorganic monovalent element salt mixtures, air drying, air spraying, steam stripping and high speed mechanical agitation.

Many energy storage devices like batteries, capacitors and photovoltaics can utilize a cathode, an anode, binder and/or an electrolyte and separator film to provide enhanced performances in mechanical stabilization, improved electrical conduction of the powder used in cathodes or electrodes and ion transport in the electro- or photoactive material and electrolyte.

Lithium ion batteries are used extensively for portable electronic equipment and batteries such as lithium ion and lead-acid are increasingly being used to provide electrical back-up for wind and solar energy. The salts for the cathode materials in lithium ion batteries are generally known to have poor electrical conductivity and poor electrochemical stability which results in poor cycling (charge/discharge) ability. Both cathode and anode materials in many battery types such as lithium ion based batteries exhibit swelling and deswelling as the battery is charged and discharged. This spatial movement leads to further separation of some of the particles and increased electrical resistance. The high internal resistance of the batteries, particularly in large arrays of lithium ion batteries such as used in electric vehicles, can result in excessive heat generation leading to runaway chemical reactions and fires due to the organic liquid electrolyte.

Lithium primary batteries consist, for example, of lithium, poly(carbon monofluoride) and lithium tetrafluoroborate together with a solvent such as gamma-butyrolactone as an electrolyte. These lithium primary batteries have excellent storage lifetimes, but suffer from only being able to provide low current and the capacity is about one tenth of what is theoretically possible. This is ascribed to the poor electrical conductivity of the poly(carbon monofluoride). In some cases a portion manganese dioxide is added to aid in the electrical conductivity and power of the lithium battery.

Attempts to overcome the deficiencies of poor adhesion to current collectors and to prevent microcracking during expansion and contraction of rechargeable batteries have included development of binders. Binders such as polyacrylic acid (PAA), for cathodes, poly(styrene butadiene), carboxymethylcellulose (CMC), styrene-butadiene (SBR), for anodes, and particularly polyvinylidene fluoride (PVDF) for cathodes and anodes, are used in lithium based batteries to hold the active material particles together and to maintain contact with the current collectors i.e., the aluminum (Al) or the copper (Cu) foil. The PAA and SBR are used as aqueous suspensions or solutions and are considered more environmentally benign than organic solvent based systems such as n-methyl 2 pyrrolidone (NMP) with PVDF.

A cathode electrode of a lithium ion battery is typically made by mixing active material powder, such as lithium iron phosphate, binder powder, i.e., high molecular weight PVDF, solvent such as NMP if using PVDF, and additives such as carbon black, into a slurry (paste) and pumping this slurry to a coating machine. An anode electrode for a lithium ion battery is made similarly by typically mixing graphite, or other materials such as silicon, as the active material, together with the binder, solvent and additives. The coating machines spread the mixed slurry (paste) on both sides of the Al foil for the cathode and Cu foil for the anode. The coated foil is subsequently calendared to make the electrode thickness more uniform, followed by a slitting operation for proper electrode sizing and drying.

For zinc-carbon batteries, the positive electrode can consist of a wet powder mix of manganese dioxide, a powdered carbon black and electrolyte such as ammonium chloride and water. The carbon black can add electrical conductivity to the manganese dioxide particles, but is needed at high weight percentages in the range about 10 to 50% by weight of manganese dioxide. These high amounts of carbon black needed for improved electrical conductivity, or reduced impedance of the battery, diminish the capacity per unit volume of the battery as less manganese dioxide can be employed per unit volume of the positive paste mix. Thus, in general, there is a need to improve the impedance of a battery while maximizing the amount of active material per unit volume.

For a lead-acid battery the anode can be made from carbon particles together with a binder to provide higher specific capacity (capacity per unit weight). The anode of a zinc-carbon battery is often a carbon rod typically made of compressed carbon particles, graphite and a binder such as pitch. The carbon particle anodes tend to have poor mechanical strength leading to fracture under conditions of vibration and mechanical shock.

The characteristics of the cathode, anode, or binder material are important for both manufacturing and performance of the battery. Some of these characteristics of relevance are electrical and ionic conductivity, tensile strength and extensibility, adhesion to particles as well as the foils, and swelling of electrolyte. Improvement of electrical and ionic conductivity is needed for improved battery capacity and power. Materials such as lithium manganese oxide for cathodes and silicon particles for anodes exhibit much lower practical specific capacity than theoretically available. A higher electrical and ionic conductivity binder material would be most beneficial to achieve specific capacities closer to their theoretical values. It is desirable to improve the tensile and adhesive strength of binders so that less binder material can be employed and also improve the battery cycling lifetime. Addition of conductive particles, such as carbon black decreases the tensile strength and extensibility of binders. Controlled swelling of the binder in electrolyte is also important. If too much swelling occurs, this separates the particles and significantly increases the inter-particle ohmic resistance. Also, since the particles of the anode or cathode are coated with binder, the layer thickness of the binder can be as thin as 50 to 100 nanometers. This layer thickness precludes uniform distributions of carbon particles of sizes larger than the binder layer thickness. For example, multiwall carbon nanotubes as usually made in a gas phase reactor consist of bundles with diameters ranging from about 50 to 500 microns in diameter and would therefor reside only at the interstitial spaces between the particles.

Impurities, such as non-lithium salts, iron, and manganese to name a few, with the binder can also be highly deleterious to battery performance. Typically, high purity of the binder material, and other additives comprising the binder material such as carbon black to improve electrical conductivity, is an important factor to minimize unwanted side reactions in the electrochemical process. For example, in alkaline-manganese dioxide batteries the total iron in the manganese dioxide is less than 100 ppm to prevent hydrogen gassing at the anode. Commercially available carbon nanotubes such as NC7000™ (Nanocyl) or Graphistrength® (Arkema) can contain as much as ten percent or more by weight of residual metal catalysts and are not considered advantageous for batteries at these levels of impurity. Generally, the impurity residue of the nanotubes employed herein may be less than about 5 weight percent, or less than about 2 weight percent, or less than about 1 weight percent.

For photovoltaics, lines of conductive paste ink, made from solvents, binders, metal powder and glass frit, are screen-printed onto solar panel modules. The binders are usually polymer based for improved printability, such as ETHOCEL™ (Dow Chemical Company). During the burning off of the polymer and cooling the lines can crack due to shrinkage forces and so increase impedance. It is highly desirable to have a more robust conductive paste ink to prevent cracking during heating and cooling.

Efforts to improve the safety of lithium ion batteries have included using non-flammable liquids such as ionic liquids, for example, ethyl-methyl-imidazolium bis-(trifluoromethanesulfonyl)-imide (EMI-TFSI), and solid polymer, sometimes with additional additives, for example, polyethylene oxide with titanium dioxide nanoparticles, or inorganic solid electrolytes such as a ceramic or glass of the type glass ceramics, $Li_{1+x+y}Ti_{2-x}Al_xSi_yP_{3-y}O_{12}$ (LTAP). The electrical conductivity values of organic liquid electrolytes are in the general range of $10^{-2}$ to $10^{-1}$ S/cm. Polymer electrolytes have electrical conductivity values in the range of about $10^{-7}$ to $10^{-4}$ S/cm, dependent on temperature, whereas inorganic solid electrolytes generally have values in the range $10^{-8}$ to $10^{-5}$ S/cm. At room temperature most polymer electrolytes have electrical conductivity values around $10^{-5}$ S/cm. The low ionic conductivities of polymer and inorganic solid electrolytes are presently a limitation to their general use in energy storage and collection devices. It is thus highly desirable to improve the conductivity of electrolytes, and particularly with polymer and inorganic electrolytes because of their improved flammability characteristics relative to organic liquids. Also, it is desirable to improve the mechanical strength of solid electrolytes in battery applications requiring durability in high vibration or mechanical shock environments, as well as in their ease of device fabrication.

In alkaline batteries the electrolyte is typically potassium hydroxide. Alkaline batteries are known to have significantly poorer capacity on high current discharge than low current discharge. Electrolyte ion transport limitations as well as polarization of the zinc anode are known reasons for this. An increase in the electrolyte ion transport is highly desirable.

Amongst new generation thin film photovoltaic technologies, dye sensitized solar cells (DSSCs) possess one of the most promising potentials in terms of their cost-performance ratio. One of the most serious drawbacks of the present DSSCs technology is the use of liquid and corrosive electrolytes which strongly limit their commercial development. An example of an electrolyte currently used for DSSCs is potassium iodide/iodine. Replacement of the presently used electrolytes is desirable, but candidate electrolytes have poor ion transport.

Typical electrolytic capacitors are made of tantalum, aluminum, or ceramic with electrolyte systems such as boric acid, sulfuric acid or solid electrolytes such as polypyrrole. Improvements desired include higher rates of charge and discharge which is limited by ion transport of the electrolyte.

A separator film is often added in batteries or capacitors with liquid electrolytes to perform the function of electrical insulation between the electrodes yet allowing ion transport. Typically, in lithium batteries the separator film is a porous polymer film, the polymer being, for example a polyethylene, polypropylene, or polyvinylidene fluoride. Porosity can be introduced, for example, by using a matt of spun fibers or by solvent and/or film stretching techniques. In lead-acid batteries, where used the separator film is conventionally a glass fiber matt. The polymer separator film comprising high-surface area carbon nanotubes of this invention can improve ion transport yet still provide the necessary electrical insulation between the electrodes.

Carbon nanotubes can be classified by the number of walls in the tube, single-wall, double wall and multiwall. Carbon nanotubes are currently manufactured as agglomerated nanotube balls, bundles or forests attached to substrates. Once removed from the substrate, manufactured nanotubes often form tightly bound "tree-trunk" like arrangements, particularly with single wall and double wall carbon nanotubes. The use of carbon nanotubes as a reinforcing agent in composites is an area in which carbon nanotubes are predicted to have significant utility. However, utilization of carbon nanotubes in these applications has been hampered due to the general inability to reliably produce higher-surface area carbon nanotubes and the ability to disperse carbon nanotubes in a matrix.

The present invention comprises improved cathodes, anodes, binders, electrolytes separator films, and composites for energy storage and collection devices like batteries, capacitors and photovoltaics comprising high-surface area carbon nanotubes, methods for their production and products obtained therefrom. High-surface area carbon nanotubes are formed by fibrillation of manufactured nanotubes. This fibrillation of nanotube is caused by a combination of targeted oxidation, and/or high energy forces such as shear forces, such as generated by sonication. Fibrillation of the tree-truck agglomerates causes the nanotubes to loosen, exposing the surface or a greater number of nanotubes and/or a greater portion of the surface the nanotubes to the surrounding environment. This allows for increased interaction between the surrounding materials and the exposed surface of the nanotubes.

For a more complete understanding of the present disclosure, and the advantages thereof, reference is now made to the following descriptions describing specific embodiments of the disclosure.

DETAILED DESCRIPTION OF THE INVENTION

Figure 1:
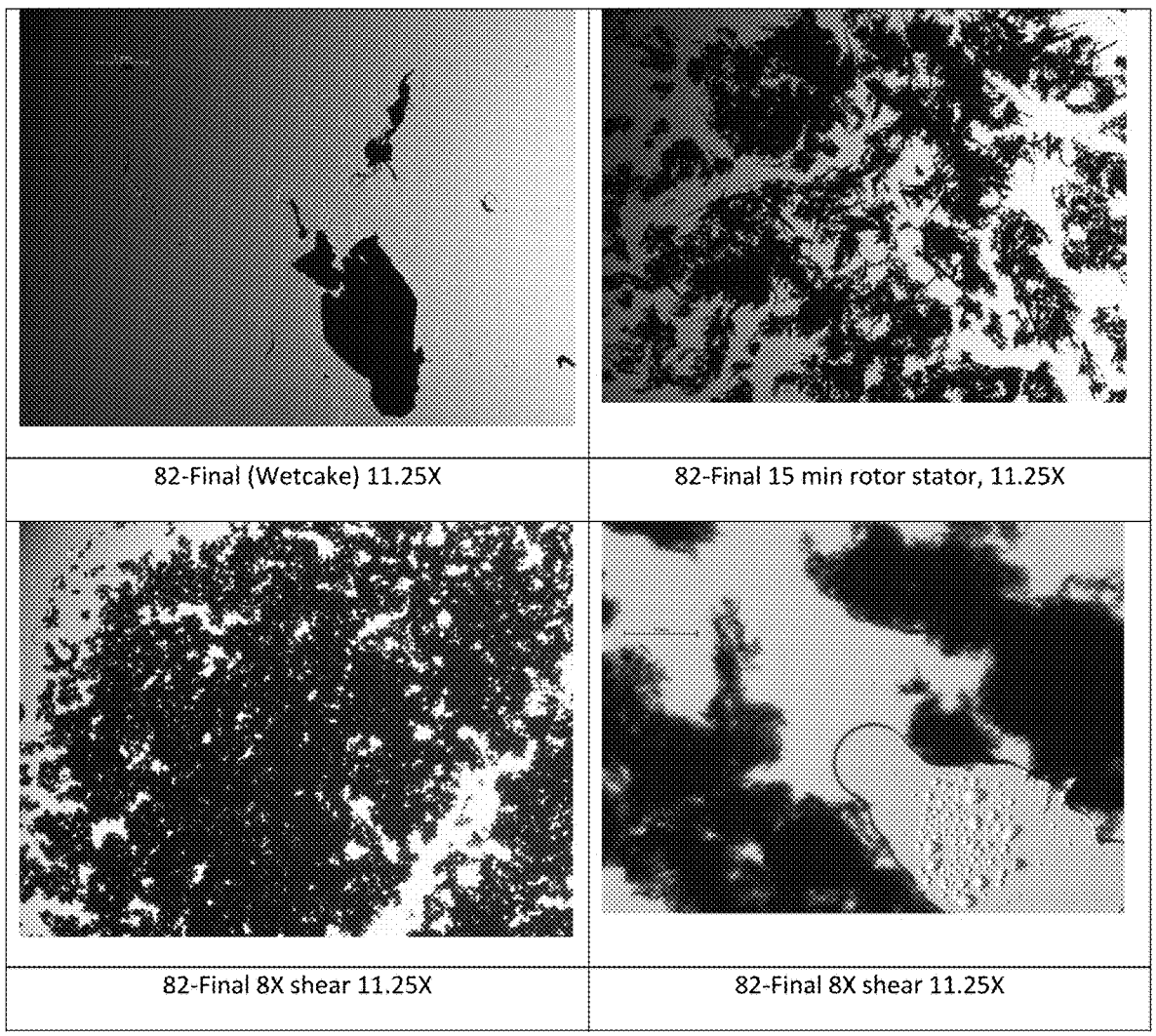
FIG. 1 is optical microscopy showing progression from a wet cake to rotor shearing.

In the following description, certain details are set forth such as specific quantities, sizes, etc., so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not, unless specifically stated in this specification or if the incorporation is necessary for maintaining validity.

Functionalized carbon nanotubes of the present disclosure generally refer to the chemical modification of any of the carbon nanotube types described hereinabove. Such modifications can involve the nanotube ends, sidewalls, or both. Chemical modifications may include, but are not limited to covalent bonding, ionic bonding, chemisorption, intercalation, surfactant interactions, polymer wrapping, cutting, solvation, and combinations thereof. In some embodiments, the carbon nanotubes may be functionalized before, during and after being exfoliated.

In various embodiments, a plurality of carbon nanotubes is disclosed comprising single wall, double wall or multi wall carbon nanotube fibers having an aspect ratio of from about 25 to about 500, preferably from about 60 to about 200, and a oxidation level of from about 3 weight percent to about 15 weight percent, preferably from about 5 weight percent to about 10 weight percent. The oxidation level is defined as the amount by weight of oxygenated species covalently bound to the carbon nanotube. The thermogravimetric method for the determination of the percent weight of oxygenated species on the carbon nanotube involves taking about 5 mg of the dried oxidized carbon nanotube and heating at 5° C./minute from room temperature to 1000 degrees centigrade in a dry nitrogen atmosphere. The percentage weight loss from 200 to 600 degrees centigrade is taken as the percent weight loss of oxygenated species. The oxygenated species can also be quantified using Fourier transform infra-red spectroscopy, FTIR, particularly in the wavelength range 1730-1680 cm'.

The carbon nanotube fibers can have oxidation species comprising of carboxylic acid or derivative carbonyl containing species and are essentially discrete individual fibers, not entangled as a mass. The derivative carbonyl species can include ketones, quaternary amines, amides, esters, acyl halogens, monovalent metal salts and the like. Alternatively or in addition, the carbon nanotubes may comprise an oxidation species selected from hydroxyl or derived from hydroxyl containing species.

As-made carbon nanotubes using metal catalysts such as iron, aluminum or cobalt can retain a significant amount of the catalyst associated or entrapped within the carbon nanotube, as much as five weight percent or more. These residual metals can be deleterious in such applications as electronic devices because of enhanced corrosion or can interfere with the vulcanization process in curing elastomer composites. Furthermore, these divalent or multivalent metal ions can associate with carboxylic acid groups on the carbon nanotube and interfere with the discretization of the carbon nanotubes in subsequent dispersion processes. In other embodiments, the oxidized fibers comprise a residual metal concentration of less than about 10000 parts per million, ppm, and preferably less than about 1000 parts per million. The metals can be conveniently determined using energy dispersive X-ray, EDX.

In another embodiment, a mixture of master batches using different rubbers added to blends of different rubbers used in the rubber compound such that each rubber has a master batch that is compatible so that the individually dispersed nanotubes are distributed whether uniformly or non-uniformly in each rubber domain. This is sometimes necessary so that blends of rubbers used in the rubber compound will have carbon nanotubes in each rubber component.

An illustrative process for producing discrete oxidized carbon nanotubes follows: 3 liters of sulfuric acid, 97 percent sulfuric acid and 3 percent water, and 1 liter of concentrated nitric acid containing 70 percent nitric acid and 3 percent water, are added into a 10 liter temperature controlled reaction vessel fitted with a sonicator and stirrer. 40 grams of non-discrete carbon nanotubes, grade Flowtube 9000 from CNano corporation, are loaded into the reactor vessel while stirring the acid mixture and the temperature maintained at 30° C. The sonicator power is set at 130-150 watts and the reaction is continued for three hours. After 3 hours the viscous solution is transferred to a filter with a 5 micron filter mesh and much of the acid mixture removed by filtering using a 100 psi pressure. The filter cake is washed one times with four liters of deionized water followed by one wash of four liters of an ammonium hydroxide solution at pH greater than 9 and then two more washes with four liters of deionized water. The resultant pH of the final wash is 4.5. A small sample of the filter cake is dried in vacuum at 100° C. for four hours and a thermogravimetric analysis taken as described previously. The amount of oxidized species on the fiber is 8 percent weight and the average aspect ratio as determined by scanning electron microscopy to be 60.

The discrete oxidized carbon nanotubes (CNT) in wet form are added to water to form a concentration by weight of 1 percent and the pH is adjusted to 9 using ammonium hydroxide. Sodium dodecylbenzene sulfonic acid and is added at a concentration 1.25 times the mass of oxidized carbon nanotubes. The solution is sonicated while stirring until the CNT are fully dispersed in the solution. Full dispersion of individual tubes is defined when the UV absorption at 500 nm is above 1.2 absorption units for a concentration of $2.5\times10^{-5}$ g CNT/ml. Latex SBR LPF 5356 (Goodyear Rubber Company) with a solids SBR concentration of 70.2% (by weight) was added to the CNT solution such that the solids ratio is 10 parts CNT for 90 parts SBR by weight.

Sulfuric acid is then added sufficient to bring the pH to 2 and sodium chloride added at a ratio of 50 g/liter of fluid while stirring. Stirring continues for 10 minutes then the coagulant is removed by filtering. The filtrate is a clear liquid. The coagulant is dried in a vacuum oven at 40° C. overnight.

As used herein, the singular terms "a" and "the" are synonymous and used interchangeably with "one or more" and "at least one," unless the language and/or context clearly indicates otherwise. Accordingly, for example, reference to "a polymeric dispersing agent" herein or in the appended claims can refer to a single polymeric dispersing agent or more than one polymeric dispersing agent. Additionally, all numerical values, unless otherwise specifically noted, are understood to be modified by the word "about."

The discrete carbon nanotubes may be present in the dispersion according to the invention in treated or untreated form. If they are treated, they have preferably been previously treated with an oxidizing agent. The oxidizing agent is preferably nitric acid and/or sulfuric acid.

A composition with discrete carbon nanotubes which have a length to external diameter ratio of more than 5, preferably more than 100, is preferred.

The discrete carbon nanotubes, especially multiwall carbon nanotubes, used preferably have an average external diameter in this case of 3 to 100 nm, particularly preferably of 5 to 80 nm, most particularly preferably of 6 to 20 nm.

A small proportion of the smallest possible agglomerates is advantageous, because as a result of this, the physical properties of viscosity and conductivity of the dispersion, as well as its processability when used according to the invention, are improved. Coarse and numerous agglomerates may in certain circumstances lead to clogging of the coating equipment during application. In addition, coarse and numerous agglomerates may lead to areas of the coating that may be thinner or thicker in depth.

A smaller proportion of carbon nanotubes leads to the resulting epoxy coating being too low-viscosity and thus possibly no longer suitable for high throughput processes. A higher proportion of carbon nanotubes also increases the viscosity beyond the level that would still appear meaningful for the coating to be used.

The at least one polymeric dispersing agent is generally at least one agent selected from the series of: water-soluble homopolymers, water-soluble random copolymers, water-soluble block copolymers, water-soluble graft polymers, particularly polyvinyl alcohols, copolymers of polyvinyl alcohols and polyvinyl acetates, polyvinyl pyrrolidones, cellulose derivatives such as e.g. carboxymethyl cellulose, carboxypropyl cellulose, carboxymethyl propyl cellulose, hydroxyethyl cellulose, starch, gelatine, gelatine derivatives, amino acid polymers, polylysine, polyaspartic acid, polyacrylates, polyethylene sulfonates, polystyrene sulfonates, polymethacrylates, polysulfonic acids, condensation products of aromatic sulfonic acids with formaldehyde, naphthalene sulfonates, lignin sulfonates, copolymers of acrylic monomers, polyethyleneimines, polyvinylamines, polyallylamines, poly(2-vinylpyridines), block copolyethers, block copolyethers with polystyrene blocks and polydiallyldimethylammonium chloride.

The at least one polymeric dispersing agent can be at least one agent selected from the series of: polyvinyl pyrrolidone, block copolyethers and block copolyethers with polystyrene blocks, carboxymethyl cellulose, carboxypropyl cellulose, carboxymethyl propyl cellulose, gelatine, gelatine derivatives and polysulfonic acids.

Most particularly preferably, polyvinyl pyrrolidone and/or block copolyethers with polystyrene blocks are used as polymeric dispersing agents. Particularly suitable polyvinyl pyrrolidone has a molecular weight Mn in the range of 5000 to 400,000. Suitable examples are PVP K15 from Fluka (molecular weight about 10000 amu) or PVP K90 from Fluka (molecular weight of about 360000 amu) or block copolyethers with polystyrene blocks, with 62 wt. % C2 polyether, 23 wt. % C3 polyether and 15 wt. % polystyrene, based on the dried dispersing agent, with a ratio of the block lengths of C2 polyether to C3 polyether of 7:2 units (e.g. Disperbyk 190 from BYK-Chemie, Wesel).

The at least one polymeric dispersing agent is preferably present in a proportion of 0.01 wt. % to 10 wt. %, preferably in a proportion of 0.1 wt. % to 7 wt. %, particularly preferably in a proportion of 0.5 wt. % to 5 wt. %.

The generally used and preferred polymeric dispersing agents are advantageous particularly in the proportions stated since, in addition to supporting a suitable dispersing of the carbon nanotubes, they also allow an adjustment of the viscosity of the coating according to the invention as well as an adjustment of surface tension and film formation and adhesion of the coating to the respective substrate.

This viscosity of the coating makes them particularly suitable for use in high throughput processes.

The at least one conductive salt in this case is preferably selected from the list of salts with the cations: tetraalkylammonium, pyridinium, imidazolium, tetraalkylphosphonium, and as anions various ions from simple halide via more complex inorganic ions such as tetrafluoroborates to large organic ions such as trifluoromethanesulfonimide are employed.

The adding of at least one conductive salt to the coatings according to the invention is advantageous because these salts possess a negligible vapour pressure. Thus, the salt is available as a film-forming agent and a conductive agent even at elevated temperatures and under reduced pressure. Particularly in the context of the coating process taking place, it may therefore be possible to prevent the coating from running.

In another development of the novel coating, the coating may additionally comprise a proportion of carbon black together with the proportions of carbon nanotubes and polymeric dispersing agent.

In connection with the present invention, carbon black refers to fine particles of elemental carbon in graphite or amorphous form. Fine particles in this context are particles with an average diameter of less than or equal to 1 μm.

If according to the development carbon black is added to the coating according to the invention, this is preferably carbon black as obtainable from EVONIC under the name Printex®PE.

The addition of a proportion of carbon black to the coating can be advantageous because with only a slight further increase in viscosity, the conductivity of the coating to be obtained can be increased further in that potential voids between the carbon nanotubes are filled with carbon black, as a result of which the conductive connection between the carbon nanotubes is established and thus the conductive cross section of the coating is increased.

The present invention also provides a process for the preparation of a composition for the production of conductive coatings based on discrete carbon nanotubes, epoxy, and at least one polymeric dispersing agent in an aqueous formulation, particularly of a printable composition according to the invention, characterized in that it comprises at least the following steps:

a) optional oxidative pretreatment of the discrete carbon nanotubes,
b) preparation of an aqueous pre-dispersion by dissolving the polymeric dispersing agent in an aqueous solvent, and the input and distribution of carbon nanotubes in the resulting solution,
c) input of a volume-based energy density, preferably in the form of shear energy, of at least $10^4$ J/m$^3$, preferably of at least $10^5$ J/m$^3$, particularly preferably $10^7$ to $10^9$ J/m$^3$ into the pre-dispersion until the agglomerate diameter of the carbon nanotube agglomerates is substantially ≤5 μm, preferably ≤3 μm, particularly preferably ≤2 μm.

Should a pretreatment of the discrete carbon nanotubes, according to step a) of the process according to the invention, take place, which is preferred, the pretreatment generally takes place by treating with an oxidizing agent.

The pretreatment with an oxidizing agent advantageously takes place preferably in that the carbon nanotubes are dispersed in a 5 to 10 wt. % aqueous solution of the oxidizing agent, and then the carbon nanotubes are separated out of the oxidizing agent and subsequently dried. The dispersing in an oxidizing agent generally takes place for a period of one to 12 h. The carbon nanotubes are preferably dispersed in the oxidizing agent for a period of 2 h to 6 h, particularly for about 4 h. The separation of discrete carbon nanotubes from the oxidizing agent generally takes place by sedimentation. The separation preferably takes place by sedimentation under the earth's gravity or by sedimentation in a centrifuge. The drying of the carbon nanotubes generally takes place in ambient air and at temperature of 60° C. to 140° C., preferably at temperatures of 80° C. to 100° C.

The oxidizing agent is generally nitric acid and/or sulfuric acid; the oxidizing agent is preferably nitric acid. The oxidizer can also be hydrogen peroxide.

The preparation of the aqueous pre-dispersion according to step b) of the novel process advantageously takes place by dissolving the at least one polymeric dispersing agent in an initial charge of water, and then adding carbon nanotubes.

According to a preferred development of the invention, organic solvents, preferably selected from the series of: $C_1$ to $C_5$ alcohol, particularly $C_1$ to $C_3$ alcohol, ethers, particularly dioxalane, and ketones, particularly acetone, may also be added to the water.

According to a preferred development of the novel coating, it is also possible to add carbon black and/or conductive salts in the context of step b) of the novel process.

The addition of discrete carbon nanotubes can take place together with the at least one polymeric dispersing agent or consecutively. Preferably the at least one polymeric dispersing agent is added first and then the carbon nanotubes are added in batches. Particularly preferably the addition of the at least one dispersing agent and then the addition of the carbon nanotubes in batches take place with stirring and/or with ultrasound treatment.

If, according to the preferred developments of the novel coating dispersions, this dispersive coating comprises conductive salts and/or carbon black, the carbon black is preferably added together with the carbon nanotubes in the same way and/or the conductive salts are added together with the at least one polymeric dispersing agent in the same way.

The consecutive and batchwise addition of carbon nanotubes with stirring and/or ultrasound for the preparation of the pre-dispersion is particularly advantageous, since this allows an improvement in the dispersing of the carbon nanotubes to achieve the finished dispersion, in which the carbon nanotubes are present in a form that is stable towards sedimentation and thus the input of energy into the pre-dispersion needed according to step c) of the process according to the invention can be reduced.

According to a preferred development of step b) of the process according to the invention, after the addition of at least one polymeric dispersing agent and the addition of carbon nanotubes, at least one conductive salt is also added.

In another embodiment, preferably after oxidation but before shear induced separation, a slurry of oxidized carbon nanotubes with concentrations from 0.5% to 3% is acidified with a strong acid to an acid concentration from 1% to 100%. Typical pH of the water wash is less than 4, preferably less than 1 and especially about 0.5. Acids can include, nitric, hydrochloric, sulfuric, and mixtures thereof. The liquid phase of the slurry is removed by filtration, centrification or other conventional solid/liquid separation technology. The subsequent filter cake is then washed with an acid at a concentration from 1% to 100. Acids can include, nitric, hydrochloric, sulfuric, and mixtures thereof. This is followed by a water washing until the acid is removed and liquid phase removal by conventional solid/liquid separation technology. A slurry of oxidized carbon nanotubes with concentrations from 0.5% to 3% is acidified with a strong acid to an acid concentration from 1% to 100%. Typical iron content starts at about 8000 ppm and is reduced by at least 70%, preferably 85%, more preferably 95% and especially 99%.

The input of the volume-based energy density, e.g. in the form of shear energy, into the pre-dispersion according to step c) of the novel process particularly preferably takes place by passing the pre-dispersion at least once through a homogenizer. In this process, the volume-based energy density can be introduced into the pre-dispersion e.g. in the area of the nozzle orifice. All embodiments known to the person skilled in the art, such as e.g. high pressure homogenizers, are suitable as homogenizers. Particularly suitable high-pressure homogenizers are known in principle e.g. from the document Chemie Ingenieur Technik, Volume 77, Issue 3 (pp. 258-262). Particularly preferred homogenizers are high-pressure homogenizers; most particularly preferred high-pressure homogenizers are jet dispersers, gap homogenizers and high-pressure homogenizers of the Microfluidizer® type.

The pre-dispersion is preferably passed at least twice through a homogenizer, preferably a high-pressure homogenizer. Particularly preferably the pre-dispersion is passed at least three times through a homogenizer, preferably a high-pressure homogenizer.

The multiple passes through a homogenizer, preferably a high-pressure homogenizer, are advantageous because any coarse agglomerates of the carbon nanotubes remaining are comminuted by this process, as a result of which the dispersion is improved in its physical properties, such as e.g. viscosity and conductivity. By adjusting the input pressure and the automatically resulting adjustment of the gap width of the homogenizer, the maximum size of any agglomerates remaining can be influenced in a targeted manner.

This economic optimum is achieved when less than 15 number % of the carbon nanotubes of the ink are still present as agglomerates of ≤10 which approximately corresponds to three passes of the pre-dispersion through the homogenizer, preferably the high-pressure homogenizer.

The homogenizer, preferably the high-pressure homogenizer, is generally a jet disperser or a gap homogenizer, which is operated with an input pressure of at least 50 bar and an automatically adjusted gap width.

The homogenizer, preferably the high-pressure homogenizer, is preferably operated with an input pressure of 1000 bar and an automatically adjusted gap width. Most particularly preferred are high-pressure homogenizers of the Micronlab type.

The alternative, equally preferred embodiment of steps b) and c) of the novel process provides the treatment of the pre-dispersion in a triple roll mill.

The preferred process is characterized in that the preparation of the pre-dispersion b) and the input of shear energy c) take place by a treatment of the pre-dispersion in a triple roll mill with rotating rolls, the process comprising at least the following steps:

b1) introduction of the solution of the polymeric dispersing agent in the aqueous solvent together with the carbon nanotubes into a first gap between a first and a second roll with different rates of rotation, wherein the carbon nanotubes are pre-dispersed in the solution and coarse agglomerates are comminuted;

b2) transport of the pre-dispersion from step b1) to a second gap between the second roll and a third roll with a different rate of rotation, the pre-dispersion at least partly adhering to the roll surface during transport;

c1) introduction of the pre-dispersion into the second gap, wherein the agglomerates of the carbon nanotubes in the dispersion are comminuted to a diameter of substantially preferably particularly preferably ≤2 μm;

c2) removal of the finished dispersion from the roll surface of the third roll.

The alternative embodiment of the process according to the invention is preferably operated in such a way that the ratio of the rate of rotation of the first roll and the second roll and the ratio of the rate of rotation of the second roll and the third roll are, independently of one another, at least 1:2, preferably at least 1:3.

The width of the gap between the first and second roll and between the second and third roll may be the same or different. The gap width is preferably the same. The gap width is particularly preferably the same and less than 10 preferably less than 5 particularly preferably less than 3 μm.

It is particularly advantageous to carry out the alternative steps b) and c) of the novel process because, as a result of the different rates of rotation of the rolls of the same diameter, high shear rates are achieved in the first and second gaps, which permit good dispersion of the carbon nanotubes. Particularly in combination with the preferred equal, small gap widths, the result is very advantageous. By means of the alternative embodiment of step c), it is possible to obtain dispersions with small proportions of agglomerates and small agglomerate sizes. In preferred embodiments, the adjustment of the gap in the homogenizer, preferably the high-pressure homogenizer, is regulated by the adjustment of the input pressure such that this is comparable to the adjustment of the gap between the rolls in the triple roll mill. In preferred embodiments, the passage through the two gaps in the triple roll mill can approximately correspond to two passes in the homogenizer, preferably the high-pressure homogenizer.

The dispersions according to the invention obtained according to the process according to the invention and its preferred and alternative embodiments are particularly suitable for use e.g. in screen printing, offset printing or similar, generally known, high throughput processes for the production of conductive printed images.

The invention also provides an electrically conductive coating obtainable by printing, particularly by means of screen printing or offset printing of the composition according to the invention on to a surface and removal of the solvent or solvents.

The invention also provides an object with surfaces of non-conductive or poorly conductive material (surface resistance of less than 104 Ohm·m) exhibiting a coating obtainable from the composition according to the invention.

In a development of the use of the dispersion according to the invention, the conductive printed image of the dispersion can optionally be thermally post-treated.

The thermal post-treatment of the printed dispersion takes place in the context of its use preferably by drying at a temperature from room temperature (23° C.) to 150° C., preferably 30° C. to 140° C., particularly preferably 40° C. to 80° C.

A thermal post-treatment is advantageous if the adhesion of the dispersion according to the invention to the substrate can be improved thereby and the printed dispersion can thereby be secured against slurring.

In addition to the good conductivity of the printed images of the dispersions according to the invention and their preferred developments, the novel dispersions also possess other properties which may be advantageous for other applications.

For example, it is generally known that the group of substances of the carbon nanotubes and also the special carbon nanotubes used according to the invention have particularly high strength. It is therefore conceivable using the dispersion according to the invention, by applying the same on to a surface, to transfer the positive mechanical properties of the special carbon nanotubes on to the surface, at least in part.

Discrete oxidized carbon nanotubes, alternatively termed exfoliated carbon nanotubes, are obtained from as-made bundled carbon nanotubes by methods such as oxidation using a combination of concentrated sulfuric and nitric acids. The techniques disclosed in PCT/US09/68781, the disclosure of which is incorporated herein by reference, are particularly useful in producing the discrete carbon nanotubes used in this invention. The bundled carbon nanotubes can be made from any known means such as, for example, chemical vapor deposition, laser ablation, and high pressure carbon monoxide synthesis. The bundled carbon nanotubes can be present in a variety of forms including, for example, soot, powder, fibers, and bucky paper. Furthermore, the bundled carbon nanotubes may be of any length, diameter, or chirality. Carbon nanotubes may be metallic, semi-metallic, semi-conducting, or non-metallic based on their chirality and number of walls. The discrete oxidized carbon nanotubes may include, for example, single-wall, double-wall carbon nanotubes, or multi-wall carbon nanotubes and combinations thereof.

During the process of making discrete or exfoliated carbon nanotubes (which can be single, double and multi-wall configurations), the nanotubes are cut into segments, preferably with at least one open end, and residual catalyst particles that are interior to the carbon nanotubes as received from the manufacturer are removed at least partially. This cutting of the tubes helps with exfoliation. The cutting of the tubes reduces the length of the tubes into carbon nanotube segments that are defined here as Molecular Rebar. Proper selection of the carbon nanotube feed stock related to catalyst particle type and distribution in the carbon nanotubes allows more control over the resulting individual tube lengths and overall tube length distribution. A preferred selection is where the internal catalyst sites are evenly spaced and where the catalyst is most efficient. The preferred aspect ratio (length to diameter ratio) is greater than about 25 and less than about 200 for a balance of viscosity and mechanical performance. Preferably, substantially all of the discrete carbon nanotubes tube ends are open ended after the MR conversion process. The selection can be evaluated using electron microscopy and determination of the discrete tube distribution.

Molecular Rebar has oxidized moieties on the surface. Oxidized moieties include, but are not limited to, carboxylates, hydroxyls, ketones and lactones. The oxidized species can react advantageously with species such as, but not limiting in scope to, an acyl halide, epoxy, isocyanate, hydroxyl, carboxylic acid, or amine group. This reaction may increase the stability of the dispersion of MR in the fluid. The weight fraction of oxidized moieties is determined from the weight loss in the temperature range 200 to 600° C. using a theromogravimetric analyzer in nitrogen run at 5° C./minute.

The residual catalyst in the Molecular Rebar is determined by heating the Molecular Rebar to 800° C. in air for 30 minutes using a thermogravimetric analyzer.

TABLE 1

Lengths (nm)

|  | Condition 1 | Condition 2 | Condition 3 |
| --- | --- | --- | --- |
| Mean | 424 | 487 | 721 |
| Standard Error | 25.3 | 34.9 | 50 |
| Median | 407 | 417.0 | 672 |
| Standard Deviation | 177 | 281 | 315 |
| Sample Variance | 31461 | 79108 | 99418 |
| Kurtosis | −0.83 | 1.5 | −0.02 |
| Skewness | 0.03 | 1.2 | 0.64 |
| Range | 650 | 1270.0 | 1364 |
| Minimum | 85 | 85.0 | 161 |
| Maximum | 735 | 1355 | 1525 |

Condition 1 is an example of a narrow distribution with low mean length. Condition 2 is an example of broad distribution with low mean length. Condition 3 is an example of high mean length and broad distribution.

Additives can be included and can further react or be completely inert with other components of the formulation. Fibrous additives can be surface active to react with surroundings. To determine tube lengths, a sample of tubes is diluted in isopropyl alcohol and sonicated for 30 minutes. It is then deposited onto a silica wafer and images are taken at 15 kV and 20,000× magnification by SEM. Three images are taken at different locations. Utilizing the JEOL software (included with the SEM) a minimum of 2 lines are drawn across on each image and measure the length of tubes that intersect this line.

Skewness is a measure of the asymmetry of a probability distribution. A positive value means the tail on the right side of the distribution histogram is longer than the left side and vice versa. Positive skewness is preferred for the nanotubes of the present invention, which indicates more tubes of long lengths. A value of zero means a relatively even distribution on both sides of the mean value. Kurtosis is the measure of the shape of the distribution curve and is generally relative to a normal distribution. Both skewness and kurtosis are unitless.

The following table shows representative values of discrete carbon nanotubes diameters:

TABLE 2

| Diameter (unrelated to condition above) | | | |
| --- | --- | --- | --- |
| Mean diameter (nm*) | 12.5 | | |
| Median diameter (nm) | 11.5 | | |
| Kurtosis | 3.6 | | |
| Skewness | 1.8 | | |
| Calculated aspect ratio (L/D) | 34 | 39 | 58 |

*nm = nanometer

Functionalized carbon nanotubes of the present disclosure generally refer to the chemical modification of any of the carbon nanotube types described hereinabove. Such modifications can involve the nanotube ends, sidewalls, or both. Chemical modifications may include, but are not limited to covalent bonding, ionic bonding, chemisorption, intercalation, surfactant interactions, polymer wrapping, cutting, solvation, and combinations thereof.

Materials comprising DCNT can have other additives such as other fibers (carbon, graphite, graphene, polymeric (polypropylene, polyethylene to name just a couple), and particulates (such as powders (carbon black), sand, diatomaceous earth, cellulose, colloids, agglomerates, antimicrobials and inorganic salts).

The DCNT molecular rebar (MR) can comprise 0.01 to 90% by weight of the formulation, preferably 0.1 to 50, more preferably 0.25 to 25% by weight of the formulation.

Based on the desired application (such as reinforcing foam articles), 10% by weight or less of the discrete carbon nanotubes MR of the formulation can comprise L/D of about 100 to 200 and about 30% or more of the discrete carbon nanotubes MR of the formulation can comprise L/D of 40 to 80. The L/D of the discrete carbon nanotubes can be a unimodal distribution, or a multimodal distribution (such as a bimodal distribution). The multimodal distributions can have evenly distributed ranges of aspect ratios (such as 50% of one L/D range and about 50% of another L/D range). The distributions can also be asymmetrical—meaning that a relatively small percent of discrete nanotubes can have a specific L/D while a greater amount can comprise another aspect ratio distribution.

For the dispersions according to the invention, the possibility thus arises of exposing the printed images obtained to further mechanical loads in the form of deforming stress (e.g. by thermoforming, if the surface consists of a polymer material), without the carbon nanotubes losing contact with one another and thus the printed images losing conductivity, as the carbon nanotubes align themselves along the direction of stress.

Other Embodiments

1. A dispersion composition comprising a plurality of oxidized, discrete carbon nanotube fibers having an aspect ratio of from about 25 to about 500, and at least one natural or synthetic elastomer, and optionally at least one filler.
2. The composition of embodiment 1 wherein at least 70 percent, preferably at least 80 percent, by weight of the nanotube fibers are fully exfoliated.
3. The composition of embodiment 1 wherein the nanotube fibers are further functionalized.

4. The composition of embodiment 1 wherein the carbon nanotube fibers comprise an oxidation level from about 3 weight percent to about 15 weight percent.
5. The composition of embodiment 1 wherein the carbon nanotube fibers comprise from about 1 weight percent to about 30 weight percent of the composition.
6. The composition of embodiment 1 in the form of free flowing particles.
7. The composition of embodiment 1 further comprising at least one surfactant or dispersing aid.
8. The composition of embodiment 1 wherein the natural or synthetic elastomer is selected from the group consisting of natural rubbers, polyisobutylene, polybutadiene and styrene-butadiene, butyl rubber, polyisoprene, ethylene propylene diene rubbers and hydrogenated and non-hydrogenated nitrile rubbers, polyurethanes, polyethers, silicones, halogen modified elastomers, especially chloroprene and fluoroelastomers and combinations thereof.
9. The composition of embodiment 1 wherein the fibers are not entangled as a mass.
10. A process to form a carbon nanotube fiber/elastomer composite comprising the steps of:
    (a) selecting discrete carbon nanotube fibers having an aspect ratio of from 25 to 500,
    (b) blending the fibers with a liquid to form a liquid/fiber mixture,
    (c) optionally adjusting the pH to a desired level,
    (d) agitating the mixture to a degree sufficient to disperse the fibers to form a dispersed fiber mixture,
    (e) optionally combining the dispersed fiber mixture with at least one surfactant,
    (f) combining the dispersed fiber mixture with at least one elastomer at a temperature sufficient to incorporate the dispersed fiber mixture to form a carbon nanotube fiber/elastomer composite/liquid mixture,
    (g) isolating the resulting carbon nanotube fiber/elastomer composite from the liquid.
11. The process of embodiment 10 wherein the carbon nanotube fibers comprise from about 1 to about 30 weight percent of the fiber/elastomer composite of (g).
12. The process of embodiment 10 wherein the liquid is aqueous based.
13. The process of embodiment 10 wherein the agitating step (d) comprises sonication.
14. The process of embodiment 10 wherein the elastomer is selected from the group consisting of natural rubbers, polyisobutylene, polybutadiene and styrene-butadiene rubber, ethylene propylene diene rubbers, butyl rubber, polyisoprene and hydrogenated and non-hydrogenated nitrile rubbers, polyurethanes, polyethers, halogen containing elastomers and fluoroelastomers and combinations thereof
15. The composition of embodiment 1 further comprising sufficient natural or synthetic elastomer to form a formulation comprising from about 0.1 to about 25 weight percent carbon nanotube fibers.
16. The composition of embodiment 1 in the form of a molded or fabricated article, such as a tire, a hose, a belt, a seal and a tank track.
17. The composition of embodiment 1 further comprising carbon black and/or silica and wherein a molded film comprising the composition has a tensile modulus at 5% strain and 25 degrees C. of at least about 12 MPa.
18. The composition of embodiment 1 further comprising carbon black and/or silica, and wherein a molded film comprising the composition has a tear property at 25 degrees C. of at least about 0.8 MPa.
19. The composition of embodiment 1 further comprising filler, and wherein a molded film comprising the composition has a tensile modulus at 5% strain and 25 degrees C. of at least about 8 MPa.
20. A carbon nanotube fiber/elastomer composite, wherein the carbon nanotube fibers are discrete fibers and comprise from about 10 to about 20 weight percent fibers and wherein the elastomer comprises a styrene copolymer rubber.
21. A method for obtaining individually dispersed carbon nanotubes in rubbers and/or elastomers comprising (a) forming a solution of exfoliated carbon nanotubes at pH greater than or equal to about 7, (b) adding the solution to a rubber or elastomer latex to form a mixture at pH greater than or equal to about 7, (c) coagulating the mixture to form a concentrate, (d) optionally incorporating other fillers into the concentrate, and (e) melt-mixing said concentrate into rubbers and/or elastomers to form elastomeric composites.
22. The method of embodiment 21 wherein the carbon nanotubes comprise less than or equal to about 2% wt of the solution.
23. The method of embodiment 21 wherein the coagulation step (c) comprises mixing with organic molecules of high water solubility such as acetone, denatured alcohol, ethyl alcohol, methanol, acetic acid, tetrahydrofuran that partially or wholly removes surfactants form the latex/carbon nanotube fiber concentrate.
24. The method of embodiment 21 wherein the coagulation step (c) comprises drying, steam stripping or mechanical agitation of the mixture to fully retain surfactants from the latex/carbon nanotube fiber concentrate.
25. The method of embodiment 21 wherein the coagulation step (c) comprises adding a polymeric coagulating agent, preferably polyethylene oxide.
26. The method of embodiment 21 wherein the coagulation step (c) comprises adding at least one acid to the mixture at pH less than or equal to about 4.5 together with at least one monovalent inorganic salt to retain surfactants from the latex/carbon nanotube fiber concentrate.
27. The method of embodiment 21 wherein the mixture or concentrate has a divalent or multivalent metal ion content of less than about 20,000 parts per million.
28. The method of embodiment 21 wherein the mixture or concentrate has a divalent or multivalent metal ion content of less than about 10,000 parts per million.
29. The method of embodiment 21 wherein the mixture or concentrate has a divalent or multivalent metal ion content of less than about 1,000 parts per million.
30. The method of embodiment 21 wherein the coagulation step (c) is such that agglomerations of carbon nanotubes comprise less than 1 percent weight of the concentrate and wherein the carbon nanotube agglomerates comprise more than 10 microns in diameter.
31. An individually dispersed carbon nanotube/rubber or carbon nanotube/elastomer concentrate comprising free flowing particles wherein the concentrate contains a concentration of less than 20,000 parts per million divalent or multivalent metal salt.
32. An individually dispersed carbon nanotube/rubber or carbon nanotube/elastomer concentrate comprising free flowing particles wherein the concentrate contains agglomerations of carbon nanotubes that comprise less than 1 percent by weight of the concentrate and wherein the carbon nanotube agglomerates comprise more than 10 micrometers in diameter.

33. A composite comprising the concentrate of embodiments 31 or 32.
34. A method of dispersing the individually dispersed carbon nanotube/rubber or carbon nanotube/elastomer concentrate into an elastomer by first melt mixing the elastomer and concentrate to a uniform consistency before addition of other fillers and oils.
35. The composition of embodiment 5 comprising a mixture of natural and synthetic elastomers such that each elastomer is compatible with at least one of the elastomers such that the nanotubes are individually dispersed in the mixture of elastomer(s).
36. The composition of embodiment 35 wherein at least one of the elastomers does not comprise nanotubes.
37. A composition comprising one first elastomer and nanotubes, another different second elastomer and nanotubes, and yet another third elastomer which does not comprise nanotubes.
38. A process to increase cure rate of a composition comprising at least one natural or synthetic elastomer and carbon nanotubes, comprising selecting discrete carbon nanotubes to form the cured composition, wherein the cured composition has at least a 25 percent curing rate increase over the curing rate obtained for a cured elastomer not comprising carbon nanotubes.
39. A composition of (A) elastomers, fillers and discrete carbon nanotubes wherein to maintain or increase stiffness or hardness as compared to (B) a composition not containing discrete carbon nanotubes, wherein composition (A) has less filler content than (B).
40. A composition of embodiment 39 wherein 1× parts per hundred elastomer discrete carbon nanotube of composition (A) replaces 5× parts per hundred elastomer or more of the non-carbon nanotube filler of composition (B), where x is 0.1-15.
41. A method of mixing carbon nanotubes and at least one first elastomer, wherein a master batch of carbon nanotubes is first melt mixed with the elastomer, either the same or different from the first elastomer, at a temperature from about 20 to about 200° C., subsequently then additional elastomers, fillers, and additives are added and melt mixed further, to produce a composition suitable for vulcanization.
42. A method of mixing carbon nanotubes and at least one first elastomer, wherein a master batch of carbon nanotubes is first mixed with the elastomer, either the same or different from the first elastomer, at a temperature from about 20 to about 200° C. and in the presence of at least one solvent, then the at least one solvent is removed, subsequently and optionally additional elastomers, fillers and additives are added and mixed further to produce a composition suitable for vulcanization.
43. A method of mixing carbon nanotubes and at least one first elastomer, wherein a master batch of carbon nanotubes is first mixed with the elastomer, either the same or different from the first elastomer, at a temperature from about 20 to about 200° C. and in the presence of at least one solvent, subsequently and optionally additional elastomers, fillers and additives are added and mixed further, followed by solvent removal to produce a composition suitable for vulcanization.

Epoxy Embodiments

1. A dispersion comprising at least one epoxy resin and a plurality of oxidized, discrete carbon nanotubes, wherein the discrete carbon nanotubes comprise an interior and exterior surface, each surface comprising an interior surface oxidized species content and an exterior surface oxidized species content, wherein the interior surface oxidized species content differs from the exterior surface oxidized species content by at least 20%, and as high as 100% and are present in the range of from about 0.1 to about 30% by weight based on the total weight of the dispersion.
2. The dispersion of embodiment 1 wherein the interior surface oxidized species content is less than the exterior surface oxidized species content.
3. The dispersion of embodiment 1 wherein the interior surface oxidized species content is up to 3 weight percent relative to carbon nanotube weight, preferably from about 0.01 to about 3 weight percent relative to carbon nanotube weight, more preferably from about 0.01 to about 2, most preferably from about 0.01 to about 1.
4. The dispersion of embodiment 1 wherein the discrete carbon nanotubes have an aspect ratio that is bimodal.
5. The dispersion of embodiment 1, further comprising at least one epoxy resin diluent.
6. The dispersion of embodiment 5, wherein the epoxy resin diluent is selected from the group consisting of a diglycidyl ether of cis-1,3-cyclohexanedimethanol, a diglycidyl ether of trans-1,3-cyclohexanedimethanol, a diglycidyl ether of cis-1,4-cyclohexanedimethanol, a diglycidyl ether of trans-1,4-cyclohexanedimethanol, a monoglycidyl ether of cis-1,3-cyclohexanedimethanol, a monoglycidyl ether of trans-1,3-cyclohexanedimethanol, a monoglycidyl ether of cis-1,4-cyclohexanedimethanol, a monoglycidyl ether of trans-1,4-cyclohexanedimethanol, one or more oligomers thereof, and mixtures thereof.
7. The dispersion of embodiment 1, further comprising a compound comprising zinc, phosphate, chromate, phosphosilicate, borosilicate, borate, nitrate, or mixtures thereof.
8. The dispersion of embodiment 7, wherein the compound comprising zinc is selected from the group consisting of zinc, zinc-oxide, zinc-hydroxide, zinc-sulfide, zinc-selenide, zinc-telluride, zinc-salts, and mixtures thereof
9. The dispersion of embodiment 7, wherein the compound comprising zinc is present in the range from about 0.1% to about 30% by weight based on the total weight of the dispersion.
10. The dispersion of embodiment 1, wherein the discrete carbon nanotubes have an aspect ratio of 25 to 500.
11. The dispersion of embodiment 1, wherein at least 70 percent by weight of the nanotubes are discrete.
12. The dispersion of embodiment 1, further comprising at least one dispersant.
13. The dispersion of embodiment 12, wherein the dispersant is selected from the group consisting of hydrophobic polymers, anionic polymers, non-ionic polymers, cationic polymers, ethylene oxide containing polymers, propylene oxide containing polymers, amphiphilic polymers, fatty acids, and mixtures thereof.
14. The composition of embodiment 1, which further comprises an additive selected from the group consisting of an epoxy resin diluent, a compound comprising zinc, a dispersant, and mixtures thereof.
15. The composition of embodiment 1 wherein at least a portion of the oxidized, discrete carbon nanotubes comprise an oxidation species selected from carboxylic acid or a derivative carbonyl containing species wherein the derivative carbonyl species is selected from ketones, quaternary amines, amides, esters, acyl halogens, and metal salts.
16. The composition of embodiment 1 wherein the oxidized, discrete carbon nanotubes comprise an oxidation species selected from hydroxyl or derived from hydroxyl containing species.
17. The composition of embodiment 1 further comprising an acrylic polymer, a silicone polymer, or a mixture thereof.
18. The dispersion of embodiment 1 wherein the plurality of oxidized, discrete carbon nanotubes comprise multiwall carbon nanotubes.
19. The composition of embodiment 1 further comprising at least one organic inhibitor selected from the group consisting of azoles, calcium alkyl-aryl sulfonates, diamines, and metal salts of dinonylnapathalene sulphonates.
20. A catheter comprising the dispersion of embodiment 1, wherein the epoxy has been at least partially cured.
21. A coating comprising the dispersion of embodiment 1, wherein the epoxy has been at least partially cured.

High Surface Area Nanotube Embodiments Useful for, e.g., Dispersions or Lithium Batteries In the following description, certain details are set forth such as specific quantities, sizes, etc., so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not.

Functionalized carbon nanotubes of the present disclosure generally refer to the chemical modification of any of the carbon nanotube types described hereinabove. Such modifications can involve the nanotube ends, sidewalls, or both. Chemical modifications may include, but are not limited to covalent bonding, ionic bonding, chemisorption, intercalation, surfactant interactions, polymer wrapping, cutting, solvation, and combinations thereof. In some embodiments, the carbon nanotubes may be functionalized before, during and after being exfoliated partially or fully.

In various embodiments, a plurality of carbon nanotubes is disclosed comprising single wall, double wall or multi wall carbon nanotubes having an aspect ratio of at least about 50, or at least about 100, or at least about 250, or at least about 500, or at least about 700, or at least about 1,000, or at least about 1,500, or at least or about 2,000, or at least about 3000 up to about 6000, or up to about 5000. In various additional embodiments the carbon nanotubes comprise an overall (total) oxidation level of from about 0.01 weight percent to about 60 weight percent, preferably from about 0.1 weight percent to about 50 weight percent, more preferably from about 0.5 weight percent to 25 weight percent, more preferably from about 1 weight percent to 20 weight percent, or from about 0.1 weight percent to 5 weight percent. The oxidation level is defined as the amount by weight of oxygenated species covalently bound to the carbon nanotube determined by thermogravimetrically. In some embodiments the oxidation level may be 0, or at least about 0.01 weight percent up to about 2 weight percent. In other embodiments the oxidation level may be from at least about 2 weight percent up to about 50 weight percent. The thermogravimetric method for the determination of the percent weight of oxygenated species on the carbon nanotube involves taking about 7-15 mg of the dried oxidized carbon nanotube and heating at 5° C./minute from 100 degrees centigrade to 700 degrees centigrade in a dry nitrogen atmosphere. The percentage weight loss from 175-575 degrees centrigade or 200 to 600 degrees centigrade is taken as the percent weight loss of oxygenated species. The range is typically selected based on the onset of weight loss of the oxygenated species. For example, with polyethers attached to the carbon nanotubes the range is set from 175-575 degrees centrigrade. The oxygenated species can also be quantified using Fourier transform infra-red spectroscopy, FTIR, particularly in the wavelength range 1730-1680 cm' or alternatively 1760, 1530 and around 1060 cm'. In some embodiments the oxidation level may be 0%.

The carbon nanotubes can have oxidation species comprising carboxylic acid or derivative carbonyl containing species. The derivative carbonyl species can include phenols, ketones, quaternary amines, amides, esters, acyl halogens, monovalent, divalent, or multivalent metal salts and the like, and can vary between the inner and outer surfaces of the tubes. Other oxygenated species can comprise, although not limited to, ether groups, ketones, and lactones, alcohols and oxiranes without limit of molecular weight.

For example, one or more types of acid can be used to oxidize the tubes exterior surfaces, followed by water washing and the induced shear, thereby breaking and/or partially separating the tubes. If desired, the formed nanotubes or high-surface area bundles, having essentially no (or zero) interior tube wall oxidation can be further oxidized with a different oxidizing agent, or even the same oxidizing agent as that used for the tubes' exterior wall surfaces at a different concentration, resulting in differing amounts—and/or differing types—of interior and surface oxidation. Additional oxygen containing molecules can be reacted onto the carbon nanotubes, for example, although not limited to, by interaction of carboxylic acid groups and hydroxyl groups, carboxylic acid groups and amine groups, azide groups, and glycidyl groups.

As-made carbon nanotubes are treated with mechanical forces such as shear forces and/or oxidation to at least partially defibrillate tightly bundled nanotube "tree-trunks". This treatment exposes more of the surface area of the individual nanotubes to the surrounding environment. In some embodiments, the high-surface area nanotubes have at least about 10% greater surface area after treatment than before. In other embodiments, the high-surface area nanotubes have at least about 20%, at least about 30%, at least about 50%, at least about 75%, or at least about 100% greater surface area after treatment than before. In some embodiments, the high-surface area nanotubes have at least about 2.5×, at least about 3×, at least about 5×, at least about 7×, at least about 10×, or at least about 20× greater surface area after treatment than before.

BET surface area of nanotubes may be measured using $N_2$ BET isotherms according to ASTM D6556-16. The BET surface area of the nanotubes herein may vary depending upon the type of nanotubes, treatment methods, and desired applications. Typically, the single and double walled nanotubes treated with shear, oxidation, or both that are described herein usually have a BET surface area of at least about 400 $m^2/g$, or of at least about 500 $m^2/g$, or at least about 550 $m^2/g$, or at least about 600 $m^2/g$, or at least about 650 $m^2/g$, or at least about 700 $m^2/g$, or at least about 750 $m^2/g$, or at least about 800 $m^2/g$, or at least about 850 $m^2/g$, or at least about 900 $m^2/g$, or at least about 1000 $m^2/g$, or at least about 1100 $m^2/g$, or at least about 1200 $m^2/g$, or at least about 1300 $m^2/g$, or at least about 1400 $m^2/g$, or at least about 1500 $m^2/g$, or at least about 1600 $m^2/g$, up to about 3000 $m^2/g$ or higher, or up to about 2500 $m^2/g$ or higher, or up to to about 2000 $m^2/g$ or higher, or up to about 1900 $m^2/g$, or up to about 1800 $m^2/g$, or up to about 1700 $m^2/g$.

Nanotube surface area may be measured using known methods including but not limited to gas adsorption techniques such as, for example, BET analysis, nitrogen, argon, and/or carbon dioxide adsorption. These measurements may be conducted isothermally. In some embodiments, the high-surface area nanotubes have a measured surface after being treated about 25%, about 40%, about 55%, about 80%, or about 95% greater than the measured surface area prior to treatment. In other embodiments, the high-surface area nanotubes have a measured surface after being treated about 2×, about 3×, about 4×, about 5×, about 7×, about 10×, or about 15× greater than the measured surface area prior to treatment.

In certain embodiments, high-surface area carbon nanotubes have a surface area greater than about 300 $m^2/g$, or greater than about 500 $m^2/g$, or greater than about 700 $m^2/g$, or greater than about 1,000 $m^2/g$, or greater than about 1,500 $m^2/g$, or greater than about 2,000 $m^2/g$, or greater than about 2,500 $m^2/g$, or greater than about 3,000 $m^2/g$. In other embodiments, high-surface area carbon nanotubes have a surface area less than about 500 $m^2/g$, or less than about 700 $m^2/g$, or less than about 1,000 $m^2/g$, or less than about 1,500 $m^2/g$, or less than about 2,000 $m^2/g$, or less than about 2,500 $m^2/g$, or less than about 3,000 $m^2/g$.

As-made carbon nanotubes using metal catalysts such as iron, aluminum or cobalt can retain a significant amount of the catalyst associated or entrapped within the structure of the carbon nanotubes, as much as five weight percent or more. These residual metals can be deleterious in such applications as electronic devices because of enhanced corrosion or can interfere with the vulcanization process in curing elastomer composites. Furthermore, these divalent or multivalent metal ions can associate with carboxylic acid groups on the carbon nanotube and interfere with the loosening and/or dispersion processes. In some embodiments, the oxidized carbon nanotubes comprise a residual metal concentration of less than about 10,000 parts per million, ppm, less than about 5,000 ppm, less than about 3,000 ppm, less than about 1,000 ppm, or be substantially free from residual metals. The metals can be conveniently determined using energy dispersive X-ray spectroscopy or thermogravimetric methods.

Bosnyak et al., in various patent applications (e.g., US 2012-0183770 A1 and US 2011-0294013 A1), have made discrete carbon nanotubes through judicious and substantially simultaneous use of oxidation and shear forces, thereby oxidizing both the inner and outer surface of the nanotubes, typically to approximately the same oxidation level on the inner and outer surfaces, resulting in individual or discrete tubes.

In many embodiments, the present inventions differ from those earlier Bosnyak et al. applications and disclosures. The present inventions describe a composition of high-surface area carbon nanotubes having targeted, or selective, oxidation levels and/or content on the exterior and/or interior of the tube walls. Such novel carbon nanotubes can have little to no inner tube surface oxidation, or differing amounts and/or types of oxygen-containing species, e.g., oxidation, between the tubes' inner and outer surfaces or among the carbon nanotubes. In the process of oxidation, or attaching oxygen containing species, the degree of fibrillation can influence the population of tubes that differ by extent or type of oxygen containing species. For example, if many of the tubes are aligned as trunks then the tubes within the core of the trunk are less likely to contain oxygenated species than the tubes on the outermost portion of the trunk. These new nanotubes are useful in many applications, including cathode material, anode material, binder material, electrolyte material, separator film material, and or composites for energy storage devices for the improvement of mechanical, electrical, and thermal properties.

One embodiment of the present invention is a composition comprising a plurality of high-surface area carbon nanotubes, wherein the high-surface area carbon nanotubes comprise an interior and exterior surface, each surface comprising an interior surface oxidized species content (also called interior oxygen containing species content because the interior oxygen species may differ from the exterior oxygen species) and an exterior surface oxidized species content (also called exterior oxygen containing species content because the interior oxygen species may differ from the exterior oxygen species), wherein the interior surface oxidized species content differs from the exterior surface oxidized species content by at least 20%, and as high as 100%, preferably wherein the interior surface oxidized species content is less than the exterior surface oxidized species content.

The interior surface oxidized species content can be up to 3 weight percent relative to carbon nanotube weight, preferably from about 0.01 to about 3 weight percent relative to carbon nanotube weight, more preferably from about 0.01 to about 2, most preferably from about 0.01 to about 1. Especially preferred interior surface oxidized species content is from zero to about 0.01 weight percent relative to carbon nanotube weight.

The exterior surface oxidized species content can be from about 0.1 to about 65 weight percent relative to carbon nanotube weight, preferably from about 1 to about 40, more preferably from about 1 to about 20 weight percent relative to carbon nanotube weight. This is determined by comparing the exterior oxidized species content for a given plurality of nanotubes against the total weight of that plurality of nanotubes.

The interior and exterior surface oxidized species content totals can be from about 0.01 to about 65 weight percent relative to carbon nanotube weight.

Another embodiment of the invention is a composition comprising a plurality of high-surface area carbon nanotubes, wherein the high-surface area carbon nanotubes comprise an interior and exterior surface, each surface comprising an interior surface and an exterior surface oxidized species content, wherein the interior surface oxidized species content comprises from about 0.01 to less than about 1 percent relative to carbon nanotube weight and the exterior surface oxidized species content comprises more than about 0.1 to about 65 percent relative to carbon nanotube weight.

In one embodiment, the invention is a composition comprising a plurality of high-surface area carbon nanotubes, wherein at least a portion of the high-surface area carbon nanotubes are open ended, wherein the composition comprises a cathode, an anode, a binder material, an electrolyte material a separator film, or a composite material for an energy storage or collection device.

In another embodiment, the composition comprises a plurality of high-surface area carbon nanotubes in which at least a portion of the carbon nanotubes are open ended and ion conducting. The composition can further comprise at least one polymer. The polymer is selected from the group consisting of vinyl polymers, preferably poly(styrene-butadiene), partially or fully hydrogenated poly(styrene butadiene) containing copolymers, functionalized poly(styrene butadiene) copolymers such as carboxylated poly(styrene butadiene) and the like, poly(styrene-isoprene), poly(methacrylic acid), poly(acrylic acid), poly(vinylalcohols), and poly(vinylacetates), fluorinated polymers, preferably poly(vinylidine difluoride) and poly(vinylidene difluoride) copolymers, conductive polymers, preferably poly(acetylene), poly(phenylene), poly(pyrrole), and poly(acrylonitrile), polymers derived from natural sources, preferably alginates, polysaccharides, lignosulfonates, and cellulosic based materials, polyethers, polyolefins, polyesters, polyurethanes, and polyamides; homopolymers, graft, block or random co- or ter-polymers, and copolymers and mixtures thereof. Other polymers that may be employed include, for example, carboxymethyl cellulose or a salt thereof such as an alkali metal salt or an alkaline earth metal salt and in particular the sodium salt, cellulose-based polymers, hydrophilic polymers with aqueous solubility over 1% w/v, polystyrene sulfonate or a salt thereof such as an alkali metal salt or an alkaline earth metal salt and in particular the sodium salt. Hydrophilic polymers may be preferable in some embodiments.

In yet another embodiment of this invention, the plurality of high-surface area carbon nanotubes are further functionalized, preferably the functional group comprises a molecule of mass greater than 50 g/mole, and more preferably the functional group comprises carboxylate, hydroxyl, ester, ether, or amide moieties, or mixtures thereof.

A further embodiment of this invention comprising a plurality of high-surface area carbon nanotubes further comprising at least one dispersion aid.

In a yet further embodiment of this invention, the plurality of carbon nanotubes further comprise additional inorganic structures comprising of elements of the groups two through fourteen of the Periodic Table of Elements. These inorganic structures can be in the form of particles, layers or as continuous media. Preferred inorganic structures include electrically conducting inorganic structures such as, but not limited to, silver or copper, magnetic inorganic structures such as, but not limited to, iron oxide and low melting point inorganic structures such as, but not limited to, indium-tin alloys Another embodiment of this invention comprises a plurality of carbon wherein the composition has a flexural strength of at least about ten percent higher than a comparative composition made without the plurality of high-surface area carbon nanotubes.

Yet another embodiment of this invention is a cathode, an anode, a binder, electrolyte or separator film composition comprising a plurality of high-surface area carbon nanotubes having a portion of carbon nanotubes that are open ended and ion conducting. In some embodiments, the composition further comprises other carbon structures. The other carbon structures may comprise components selected from the group consisting of carbon black, graphite, graphene, oxidized graphene, fullerenes and mixtures thereof. Preferably the graphene or oxidized graphene have at least a portion of high-surface area carbon nanotubes interspersed between the graphene or oxidized graphene platelets.

A yet further embodiment of this invention is a composition comprising a plurality of high-surface area carbon nanotubes where the cathode, anode, or binder material has an impedance of less than or equal to about one billion $(1 \times 10^9)$ ohm-m and the electrolyte material has a charge transfer resistance of less than or equal to about 10 million $(1 \times 10^7)$ ohm-m.

Another embodiment of this invention comprises an electrolyte or separator film composition comprising a plurality of high-surface area carbon nanotubes wherein the carbon nanotubes are oriented. The orientation is accomplished by fabrication techniques such as in a sheet, micro-layer, micro-layer with vertical film orientation, film, molding, extrusion, or fiber spinning fabrication method. The orientation may also be made via post fabrication methods, such as tentering, uniaxial orientation, biaxial orientation and thermoforming. The orientation may also be introduced by 3-D printing techniques. The oriented carbon nanotubes of this invention may be extracted from the oriented fiber or sheet containing the oriented carbon nanotubes by removal of the matrix material, such as, but not limited to, using a liquid solvent to dissolve a polymer matrix, acid to dissolve an inorganic matrix or degradation of the matrix by chemical means.

A further embodiment of this invention is a composition comprising a plurality of high-surface area carbon nanotubes wherein the portion of open ended tubes comprise electrolyte. For an electrolyte comprising polymer, the polymer is preferred to comprise a molecular weight of the polymer less than 10,000 daltons, such that the polymer can enter within the tube. The electrolyte may contain liquids.

An additional embodiment of this invention comprises a composition including a plurality of high-surface area carbon nanotubes, and wherein at least a portion of the high-surface area carbon nanotubes are open ended. The disclosed high-surface area nanotubes include increased length and diameter bundles wherein at least about 5% of the nanotubes have a portion of their outer surface exposed to the surrounding environment. Such high-surface area nanotubes include defribillated bundles. The bundles may have an average length of at least about 400 nm, about 800 nm, about 1 μm, about μm, about 10 μm, about 50 μm, about 100 μm, about 500 μm, about 1,000 μm, about 1,250 μm, about 1,400 μm, about 1,500 μm, about 1,600 μm, about 1,800 μm, about 2,000 μm, about 3,000 μm, or about 5,000 μm. Such bundles may have a diameter of about 1 μm, or about 3 μm, or about 5 μm, or about 7 μm, or about 8 μm, or about 9 μm, or about 10 μm, or about 12 μm. In preferred embodiments, the high-surface area carbon nanotubes are bundles of singled walled nanotubes with individual aspect ratios of at least about 50, at least about 100, at least about 300, at least about 500, at least about 700, at least about 900, at least about 1,000, at least about 1,200, at least about 1,500, or at least about 2,000, or at least about 3,000, or at least about 5,000, or at least about 10,000.

In statistics, a bimodal distribution is a continuous probability distribution with two different modes. These appear as distinct peaks (local maxima) in the probability density function. More generally, a multimodal distribution is a continuous probability distribution with two or more modes.

The high-surface area carbon nanotubes can have a unimodal, bimodal or multimodal distribution of diameters and/or lengths both for the individual nanotubes which make up a high-surface area bundle and for the high-surface area bundles themselves. These compositions are useful in cathode materials, anode materials, binder materials, separator materials, and electrolytes of the invention.

In yet another embodiment, the invention is an electrode paste, preferably an anode paste, for a lead acid battery, the paste comprising high-surface area carbon nanotubes having an average length and/or high-surface area bundle length of at least about 1 μm, about 5 μm, about 10 μm, about 50 μm, about 100 μm, about 500 μm, about 1,000 μm, about 1,250 μm, about 1,400 μm, about 1,500 μm. The embodiment further comprising, dispersing aids such as, but not limited to, polyvinyl alcohol, water, lead oxide and/or sulfuric acid. Preferably, the carbon nanotubes, dispersing aid, and water form a dispersion, and the dispersion is then contacted with lead oxide followed by sulfuric acid to form the electrode paste of a lead acid battery, or other cathode or anaode materials to form other types of batteries. Other suitable solvents for aiding in the dispersion of carbon nanotubes include, for example, renewable solvents such as CYRENE™ (Dihydrolevoglucosenone) or solvents such as glycols. The solvents may be miscible with, for example, deionized water.

Another embodiment of the invention is a composition consisting of high-surface area carbon nanotubes, wherein the high-surface area carbon nanotubes are coated with water, oils, waxes, nitric acid, or sulfuric acid. This coating reduces and/or prevents the formation of Van der Waals, electrical, or electrostatic forces between the carbon nanotubes, thereby reducing and/or preventing the high-surface area carbon nanotubes from agglomerating into a tight bundle, thereby reducing the exposed surface area of the carbon nanotubes, CNT.

In some embodiments, the composition may comprise as much as 99.99% composite material and as little as about 0.01% carbon nanotubes by weight, or as little as about 0.025% carbon nanotubes by weight. In other embodiments, the composition may contain as much as 2% carbon nanotubes (CNTs), or as much as 5% CNTs, or as much as 10% CNTs, or as much as 20% CNTs, or as much as 10% CNTs, or as much as 20% CNTs, or as much as 35% CNTs, or as much as 50% CNTs, or as much as 80% CNTs by weight. Removing the water or other coating material from the composite by drying could lead to the formation of anhydride, Van der Waals, electrostatic, or other bonds between the carbon nanotubes. The formation of these bonds could lead to the CNTs being difficult to disperse or re-agglomerating and ceasing to be high-surface area carbon nanotubes. Surprisingly, the use of surfactants may not be required in the formation of the disclosed compositions and thus there is little to no surfactant contained within the composition. This allows the incorporation of high-surface area carbon nanotubes into a matrix without the use of a surfactant which may reduce the connectivity or crosslinking of the matrix or otherwise interfere with the desired mechanical properties of the matrix.

The high-surface area carbon nanotubes of any composition embodiment above preferably comprise a plurality of open ended tubes, more preferably the plurality of high-surface area carbon nanotubes comprise a plurality of open ended tubes. The high-surface area carbon nanotubes of any composition embodiment above are especially preferred wherein the inner and outer surface oxidation difference is at least about 0.2 weight percent.

The high-surface area carbon nanotubes of any composition embodiment above preferably comprise a portion of carbon nanotubes that have a different amount of oxygen containing species than another portion. The high-surface area carbon nanotubes of any composition embodiment above are especially preferred wherein a portion of the carbon nanotubes differ from another portion of carbon nanotubes by at least about 0.2 weight percent.

The compositions described herein can be used as an ion transport. Various species or classes of compounds/drugs/chemicals which demonstrate this ion transport effect can be used, including ionic, some non-ionic compounds, hydrophobic or hydrophilic compounds. Ethers, carbonates and polyethers in electrolytes are known to help convey lithium ion species.

The new carbon nanotubes disclosed herein are also useful in ground water remediation.

The compositions comprising the novel high-surface area targeted oxidized carbon nanotubes can also be used as a component in, or as, a sensor.

The compositions disclosed herein can also be used as a component in, or as, drug delivery or controlled release formulations.

The compositions disclosed herein may be used as a structural scaffolding for catalysts. As discussed, catalysts, enzymes, proteins, peptides or other small or large molecules may be attached to the exterior of the disclosed carbon nanotubes. The disclosed nanotube scaffolding may be useful for positioning the attached catalysts within a matrix, positioning multiple catalytic proteins or molecules with respect to each other.

Magnetic particles may be bound or attached to the carbon nanotubes disclosed herein. The bound magnetic particles may be used to influence the orientation, location, or position of the carbon nanotube to which the magnetic particle is attached. Applying a magnetic field to carbon nanotubes bound to magnetic particles may allow the carbon nanotube to be moved to a particular location. Magnetic fields may be generated by natural magnets or electromagnetic devices including at least, MRI, fMRI, or pulsed electromagnetic field generator devices. Additionally, a single magnetic field generation device may be utilized or multiple magnetic field generation devices may be used. In some embodiments, an array of EMF generators may be used to move CNTs bound to magnetic particles and/or cause such CNTs to vibrate, rotate, oscillate, or to direct CNTs from one specific position to another.

More than one species of magnetic particle may be bound to a single carbon nanotube. In some embodiments, the distinct species of magnetic particle may behave differently in the same magnetic field, thus creating an increased variety of possibilities for impacting the behavior of carbon nanotubes attached to more than one species of magnetic particle.

Magnetic particles bound to carbon nanotubes may comprise approximately 0.001 weight percent relative to carbon nanotube weight, or may comprise approximately 0.01 weight percent relative to carbon nanotube weight, or may comprise approximately 0.1 weight percent relative to carbon nanotube weight, or may comprise approximately 1 weight percent relative to carbon nanotube weight, or may comprise approximately 10 weight percent relative to carbon nanotube weight, or may comprise approximately up to 50 weight percent relative to carbon nanotube weight, or may comprise up to approximately 90 weight percent relative to carbon nanotube weight.

Carbon nanotubes bound to magnetic particles may additionally contain a payload molecule as discussed above or have peptides, small molecules, nucleic acids, or other drugs or molecules attached to their exterior. These combinations may allow the nanotube, along with its associated payload or substantially non-magnetic attached molecule to be directed to a particular location where the payload molecule of the attached molecule may be desired. In this manner, targeted molecules could be delivered to a particular location using a controlled magnetic field.

In some embodiments, magnetic fields may be used in order to flex or distort carbon nanotubes or a network, matrix, or scaffold of carbon nanotubes. If an open ended, payload carrying nanotube is flexed or distorted as described, this may increase the rate at which the interior payload molecule is emptied into the surrounding environment thereby enabling the controlled, targeted, and/or timed release of payload molecules. Similarly, the described flexing of a network of carbon nanotubes may increase the rate at which payload molecules are loaded into the interior of open ended nanotubes or allow molecules to be entrapped within the interior spaces of the nanotube network itself while remaining external to any particular nanotube.

Batteries comprising the compositions disclosed herein are also useful. Such batteries include lithium, nickel cadmium, or lead acid types.

Formulations comprising the compositions disclosed herein can further comprise molecules comprising an epoxide moiety (moiety may also be referred to as chemical group), or a urethane moiety, or an ether moiety, or an amide moiety, an alkane moiety, or a vinyl moiety. The molecules may be in a rigid or elastomeric or fluid state at room temperature. Such formulations can be in the form of a dispersion. The formulations can also include nanoplate structures.

The compositions can further comprise at least one hydrophobic material in contact with at least one interior surface.

The present invention relates to a composition comprising a plurality of high-surface area carbon nanotubes and a plasticizer wherein the high-surface area carbon nanotubes can be functionalized with oxygen containing species on their outermost wall surface. One group of high-surface area carbon nanotubes comprise an interior and exterior surface, each surface comprising an interior surface and exterior surface oxidized species content wherein the interior surface oxidized species content comprises from about 0.01 to less than about 1 percent relative to carbon nanotube weight and the exterior surface oxidized species content comprises more than about 1 to about 3 percent relative to carbon nanotube weight. The oxygen species can comprise carboxylic acids, phenols, ketones, lactones, or combinations thereof.

The composition can further comprise a plasticizer selected from the group consisting of dicarboxylic/tricarboxylic esters, timellitates, adipates, sebacates, maleates, glycols and polyethers, polymeric plasticizers, bio-based plasticizers and mixtures thereof. The composition can comprise plasticizers comprising a process oil selected from the group consisting of naphthenic oils, paraffin oils, paraben oils, aromatic oils, vegetable oils, seed oils, and mixtures thereof.

The composition can further comprise a plasticizer selected from the group of water immiscible solvents consisting of but not limited to xylene, pentane, methylethyl ketone, hexane, heptane, ethyl acetate, ethers, dicloromethane, dichloroethane, cyclohexane, chloroform, carbon tetrachloride, butyl acetate butanol, benzene, cresol or mixtures thereof.

In yet another embodiment the composition is further comprises an inorganic filler selected from the group consisting of silica, nano-clays, carbon black, graphene, glass fibers, and mixtures thereof.

In another embodiment the composition is in the form of free flowing particles.

In another embodiment, the composition comprises a plurality of high-surface area carbon nanotubes and a plasticizer wherein the high-surface area carbon nanotubes comprise from about 10 weight percent to about 90 weight percent, preferably 10 weight percent to 40 weight percent, most preferably 10 to 20 weight percent.

Another embodiment is the composition of high-surface area carbon nanotubes in a plasticizer further mixed with a least one rubber. The rubber can be natural or synthetic rubbers and is preferably selected from the from the group consisting of natural rubbers, polyisobutylene, polybutadiene and styrene-butadiene rubber, butyl rubber, polyisoprene, styrene-isoprene rubbers, styrene-isoprene rubbers, ethylene, propylene diene rubbers, silicones, polyurethanes, polyester-polyethers, hydrogenated and non-hydrogenated nitrile rubbers, halogen modified elastomers, flouro-elastomers, and combinations thereof.

Another embodiment is the composition of high-surface area carbon nanotubes in a plasticizer further mixed with at least one thermoplastic polymer or at least one thermoplastic elastomer. The thermoplastic can be selected from but is not limited to acrylics, polyamides, polyethylenes, polystyrenes, polycarbonates, methacrylics, phenols, polypropylene, polyolefins, such as polyolefin plastomers and elastomers, EPDM, and copolymers of ethylene, propylene and functional monomers.

Yet another embodiment is the composition of high-surface area carbon nanotubes in a plasticizer further mixed with at least one thermoset polymer, preferably an epoxy, or a polyurethane. The thermoset polymers can be selected from but is not limited to epoxy, polyurethane, or unsaturated polyester resins.

General Process to Produce High-Surface Area Carbon Nanotubes Having Targeted Oxidation Disclosed are embodiments of compositions containing high-surface area carbon nanotubes for the improved performance of energy storage devices, including, but not limited to lithium ion battery technology. In some disclosed embodiments, single layer pouch cells in silicon containing anodes show tremendous cycle life improvement when carbon nanotubes such as produced by OCSiAl single wall carbon nanotubes (SWNTs) are treated according to the disclosed processes to create high-surface area single wall carbon nanotubes. Other manufacturers of carbon nanotubes that may be suitable for use in the applications described herein include, for example, Southwest Nanotechnologies, Zeonano or Zeon, CNano Technology, Nanocyl, ACS Materials, American Elements, Chasm Technologies, Haoxin Technology, Hanwha Nanotech Group, Hyperion Catalysis, KH Chemical, Klean Commodities, LG Chem, Nano-C, NTP Shenzhen Nanotech Port, Nikkiso, Raymor, Saratoga Energy, SK Global, Solid Carbon Products, Sigma Aldrich, Sun Nanotech, Thomas Swan, TimesNano, Tokyo Chemical Industry, XF Nano, and OCSiAl.

The data below shows details of both the oxidation process and the subsequent shearing or disruptive force treatment of the tubes. During shearing, samples may be subjected to intensely disruptive forces generated by shear (turbulent) and/or cavitation with process equipment capable of producing energy densities as high as of $10^6$ to $10^8$ Joules/m$^3$. Equipment that meets this specification includes but is not limited to ultrasonicators, cavitators, mechanical homogenizers, pressure homogenizers and microfluidizers (Table 3). One such homogenizer is shown in U.S. Pat. No. 756,953, the disclosure of which is incorporated herein by reference. Additional shearing equipment includes, but is not limited to, HAAKE™ mixers, Brabender mixers, Omni mixers, Silverson mixers, Gaullin homogenizers, and/or twin-screw extruders. After shear processing, the carbon nanotubes bundles have been loosened, thereby exposing the surface of a greater number of nanotubes and/or a greater portion of the surface of the nanotubes to the surrounding environment. Typically, based on a given starting amount of entangled as-received and as-made carbon nanotubes, a plurality of high-surface area oxidized carbon nanotubes results from this process, preferably at least about 60%, more preferably at least about 75%, most preferably at least about 95% and as high as 100%, with the minority of the tubes, usually the vast minority of the tubes remaining tightly bundled and with the surface of such tightly bundled nanotubes substantially inaccessible.

Example 1—Oxidizing Tuball™ (OCSiAl)

Thirty-five grams of >64% nitric acid is heated to 95 degrees C. To the acid, 15 grams of as-received, single-walled carbon nanotubes (Tuball™) are added. The as-received tubes have the morphology of tightly bundled tree-trunks. The mixture of acid and carbon nanotubes are mixed while the solution is kept at about 95 degrees Celsius for 5 hours and is labeled "oSWCNT-82-2". At the end of the reaction period, the oSWCNT 82-2 are filtered to remove the acid and washed with reverse osmosis (RO) water to pH of 3-4. The resulting CNTs were oxidized to about 3.6% and contained about 4.4% metal residue.

Variations on this process were also conducted using slightly differing parameters as shown below in Table 1:

Samples oxidized by an acid process: e.g. 35 g $HNO_3$ (65%)/15 g Tuball™, 95° C. oxidation.

23.33 g $HNO_3$ (65%)+10.01 g CNT. T=95° C. Initial big plume of NOx at addition of CNT.

TABLE 1

| Time (hr) | T(° C.) | % Ox | % Res |
| --- | --- | --- | --- |
| 0 | 94.2 | 1.11 | 21.7 |
| 1 | 95.6 | 2.5 | |
| 2 | 95.6 | 2.4 | 4.5 |
| 3 | 95.6 | 2.4 | 4.9 |
| 4 | 96.2 | 2.3 | 5.4 |
| 5 (82-final) | 95.6 | 3.6 | 4.4 |

The samples were washed to pH 3.6. 25.17 g recovered @27.1% solids
Sample 82-2
34.98 g $HNO_3$, 15 g Tuball™

TABLE 2

| Time (hr) | T(° C.) | % Ox | % Res |
| --- | --- | --- | --- |
| 0.5 | 96.2 | 2.6 | 5.5 |
| 1 | 95.9 | 2.4 | 5.6 |
| 2 | 95.9 | 2.8 | 5.3 |
| 3 | 93.2 | 2.4 | 4.9 |
| 4 | 94.2 | 2.4 | 5.6 |
| 5 | 93.9 | 2.5 | 7.0 |

Washed to pH 3.75, 37.26 g recovered at 27.5% solids
Sample 82-3
23.3 g $HNO_3$, 10 g Tuball™ CNT. 5 hr oxidation=2.5% Ox, 9.95% Residue, 20.2% solids. 31 g recovered @ 20.2% solids.

Example 2—Shear Treatment of Non-Oxidized and Oxidized OCSiAl Tubes

Example 2A—Shear Treatment of Oxidized OCSiAl Tubes

Sample volume ~1200 mL. Use 1.5 L stainless steel container for Rotor/Stator (R/S) work.
Oxidized OCSiAl ~0.15%
Oxidized OCSiAl source: 82-final (pH 3.61, 27.1% solids)
1200 g×0.15%=1.8 g dry equiv.=6.64 g wetcake. Used 6.65 g wetcake.
Check viscosity through Rotor Stator (R/S) as shown below.

| T (min) | T (° C.) | Comments |
| --- | --- | --- |
| 0 | 23 | |
| 5 | 31 | Clear liquid droplets on plastic covering vessel opening. Not viscous |
| 9 | 41 | Clear liquid droplets on plastic covering vessel opening. Not viscous +6.62 g wetcake |
| 15 | 50 | Viscous mixture. Proceed to shearing |

Place in Freezer for ~1.5 hr.

Shearing

| Pass # | T (° C.) | Comments |
| --- | --- | --- |
| 1 | 25 | 1500 psi because noticed some large particles present when cleaning the rotor stator |
| 2 | 36 | |
| 3 | 42 | Place in freezer 45 minutes → 15° C. |
| 4 | 31 | |
| 5 | 37 | |
| 6 | 45 | |
| 7 | 51 | 1 hr freezer → 25° C. |
| 8 | 39 | Sample for optical microscopy |

Sample name 180417-MF-1A (0.26% solids), 180417-MF-1B (0.22% solids) 19 g.

Optical Microscopy, shown in FIG. 1, shows a progression from wetcake to rotor shearing 8 cycles shearing with a high shear rate mixer. R/S performs the initial breakup of the bundles and this is significantly furthered by passing through a shearing device. The experimental results described throughout are expected to be obtainable using multiple shearing devices including those described in Table 3 as well as HAAKE™ mixers, Brabender mixers, Omni mixers, Silverson mixers, Gaullin homogenizers, and/or twin-screw extruders and/or the Netzch Omega® Economic Dispersionionizer and/or the Sonolator from Sonic Corp.

TABLE 3

| Homogenizer Type | Flow Regime | Energy Density (J $\cdot m^{-3}$) |
| --- | --- | --- |
| Stirred tanks | turbulent inertial, turbulent viscous, laminar viscous | $10^3$-$10^6$ |
| Colloid mil | laminar viscous, turbulent viscous | $10^3$-$10^8$ |

TABLE 3-continued

| Homogenizer Type | Flow Regime | Energy Density (J $\cdot$m$^{-3}$) |
|---|---|---|
| Toothed - disc disperser | turbulent viscous | $10^3$-$10^8$ |
| High pressure homogenizer | turbulent inertial, turbulent viscous, cavitation inertial, laminar viscous | $10^6$-$10^8$ |
| Ultrasonic probe | cavitation inertial | $10^6$-$10^8$ |
| Ultrasonic jet | cavitation inertial | $10^6$-$10^8$ |
| Microfluidization | turbulent inertial, turbulent viscous | $10^6$-$10^8$ |
| Membrane and microchannel | Injection spontaneous transformation based | Low $10^3$ |

Excerpted from *Engineering Aspects of Food Emulsification and Homogenization*, ed. M. Rayner and P. Dejmek, CRC Press, New York 2015.

Example 2B—Shear Treatment of Unmodified OCSiAl 600 mL@0.4% solids=2.4 g OCSiAl.
OCSiAl source: TUBALL™ single wall carbon nanotubes. Batch number 01RW01.N1.257 production date: 20 Dec. 2016.
Rotor/Stator—Conducted in 800 mL plastic container in an ice bath.

| t (min) | T (° C.) | Comments |
|---|---|---|
| 0 | 21 | |
| 5 | 48 | Higher viscosity than oxidized OCSiAl .3% |
| 10 | 65 | Place in freezer to cool prior to shearing for 50 minutes. This brings the temperature to 27° C. |

Shearing Treatment:

| Pass # | T (° C.) | Comments |
|---|---|---|
| 0 | 27 | 2000 psi to allow larger particles to pass. |
| 1 | 36 | 8000 psi |
| 2 | 36 | |
| 3 | 38 | |
| 4 | 41 | |
| 5 | 43-48 | 43 top, 48 at bottom of container. Use this higher number. 11:15 AM place in freezer |
| 6 | 29 | |
| 7 | 32-38 | 32 top, 38 bottom of container. |
| 8 | 44 | |

Sample 180418-MF-1. Measured 0.34% solids (17 g sample size) ~500 g sample recovered.

Example 2C—Oxidized OCSiAl/MA 14 Through Shearing Device

An 80/20 ratio of MA 14/oxidized OCSiAl was prepared. This was conducted by taking the wetcake of both of these components and passing them through the rotor stator followed by shear treatment. Thus, the oxidized OCSiAl is being broken up at the same time the o-CNT is being converted to Molecular Rebar® in order to give further improvements in lithium ion battery performance.

600 mL sample size, 1.5% MR. Molecular Rebar® source MA-14 (12.95% solids).
Oxidized OCSiAl ("82-final", 27.1% solids)
600×0.015=9 g/0.1295=69.498 g MA 14.
0.8 g MA-14/0.02 g oxidized OCSiAl=9 g MA-14/0.225 g Oxidized OCSiAl.
0.225 g oxidized OCSiAl=0.225/0.271=0.83 g 82-final.

Rotor Stator Treatment:

| time (min) | T (° C.) | Comments |
|---|---|---|
| 0 | 21 | |
| 5 | 45 | |
| 10 | 62 | → Freezer 40 minutes |

Shearing Treatment:

| Pass # | T (° C.) | Comments |
|---|---|---|
| 0 | 26 | 2000 psi to allow larger particles to pass. |
| 1 | 32 | 8000 psi |
| 2 | 37 | Very viscous - extrudes as rope. Add ~30 ml H2O |
| 3 | 33 | |
| 4 | 39 | |
| 5 | 45 | |
| 6 | 47 | |
| 7 | 48 | → Freezer 30 min |
| 8 | 36 | Add H2O at end for material recovery in tube supply/exit line |

Sample=180419-MF-1. 730 g collected. 1.12% Solids.

Example 3—Performance in Li Ion Battery Pouch Cells

Figure 2:
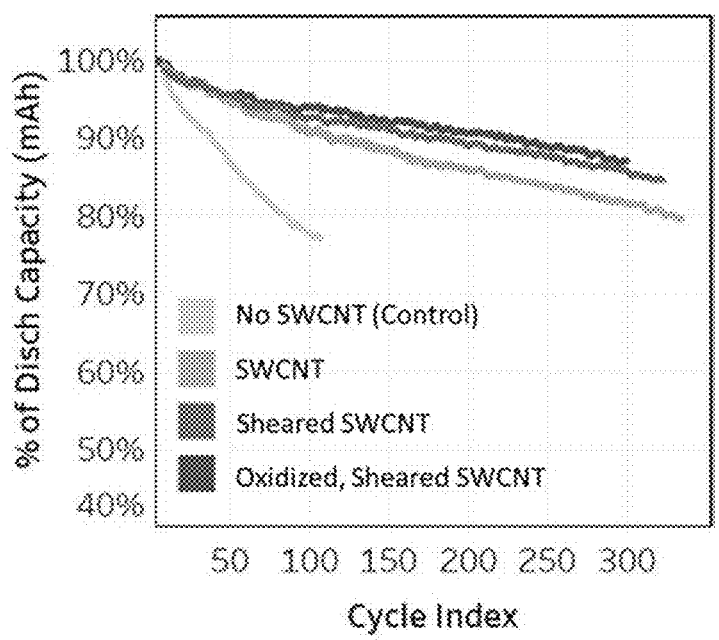
FIG. 2 shows the effect of oxidation and processing on capacity vs. cycle.

The oxidized and non-oxidized OCSiAl cells were formed into Li ion battery single layer pouch cells—cell details below:
NCM523 Cathode/Anode
Anode Details:
20% SiOx+71% Graphite+1% CMC+1.5% SBR+1% C65+noted % XP in FIG. 2.
Loading: ~10 mg/cm$^2$
Cathode Loading: 4.2 mAh/cm$^2$
Separator: Glass fiber—Whatmann GF/F
Housing: 40 mAh Single layer Pouch
FIG. 2 shows a comparison of a control vs. OcSiAl Tuball™ Batt product (PVP dispersion) vs. the effect of oxidation and processing (shearing, sonication, etc.).

The control (no carbon nanotubes) shows very low cycle life. End of cycle life in the industry is generally regarded as the point at which the capacity has faded to 80% of the original capacity—i.e., the cell can now only be charged to 80% of its initial capacity—it will not accept any more charge. The reasons are many, but in silicon based anodes, the major culprit is loss of electrical connectivity is due to cracking of the silicon particles which swell upon charging (they get loaded with Lithium from the cathode) and discharging (Li moves back to the cathode). When the silicon particles swell they push the graphite particles closer together but these do not move back upon de-swell resulting in gaps and particles that are now electrically isolated.

Putting the OCSiAl through a shearing treatment clearly improves the cycle life vs. unprocessed OCSiAl. Further improvements are achieved with oxidation and shearing. This is due to the fibrillation and increased surface area which can span the gaps described above. With fibrillation there are more connected particles vs. non-fibrillated.

Figure 3:
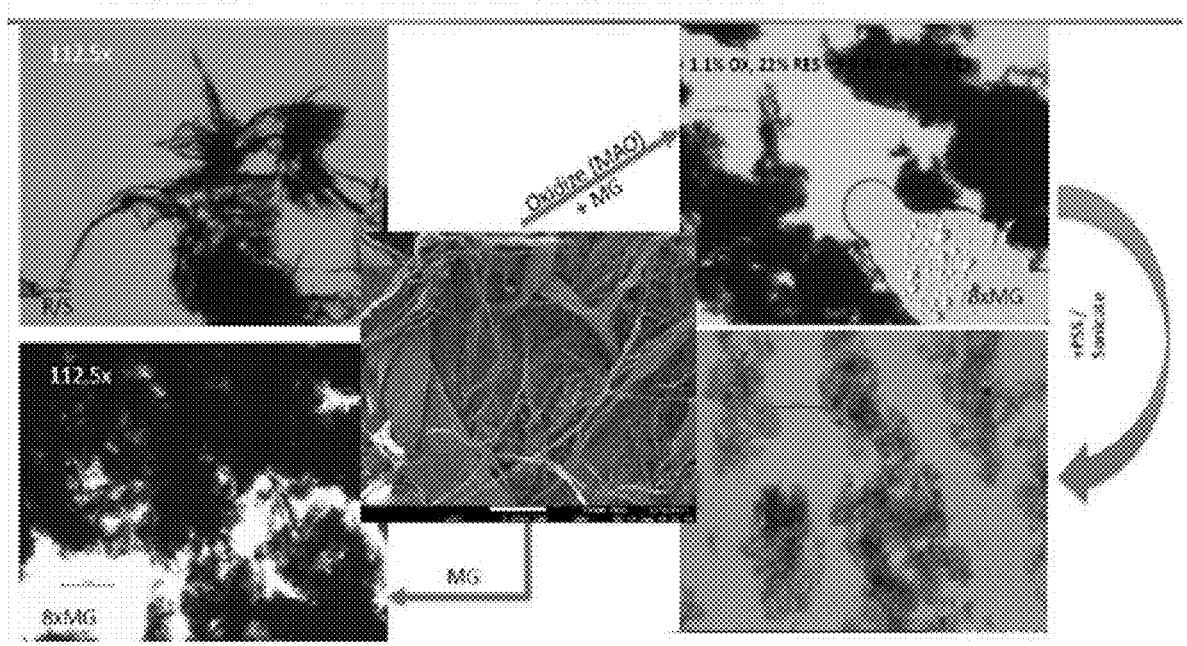
FIG. 3 shows optical micrographs of various compositions.

FIG. 3 shows Optical Microscopy (all images at ~same magnification). The center electron micrograph shows the "as received" OCSiAl dry powder. It is a ribbon or tree trunk type structure with a very small amount of fibrillation and low surface area. In this structure the majority of the tubes surface area is not exposed as it is protected by surrounding tubes. The top left image shows effect of putting a dilute (~0.15%) solution in water through a rotor/stator at 9900 rpm for 10 minutes. Clearly this process has some effect on breaking up the ribbons and causing some level of fibrillation thus increasing the surface area (SA).

The bottom left image of FIG. 3 shows effect of putting the above material through a shear treatment—further increasing the fibrillation and thus increasing the exposed surface area. Top right shows oxidized OCSiAl through the shearing treatment—again increasing the fibrillation and thus surface area. Oxidation introduces functionality to the material and significantly reduces the amount of residual metal contamination. Bottom right shows the effect of adding surfactant to the oxidized sheared material followed by sonication. Sonication resulted in further increase in fibrillation and surface area.

Figure 4A:
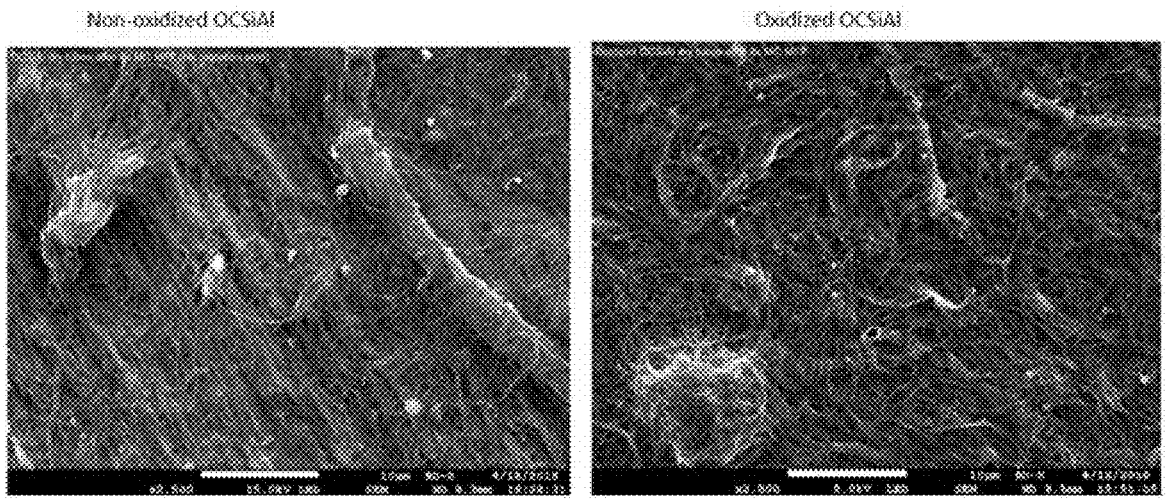
FIGS. 4A and 4B are micrographs showing the effect of shear.
Figure 4B:
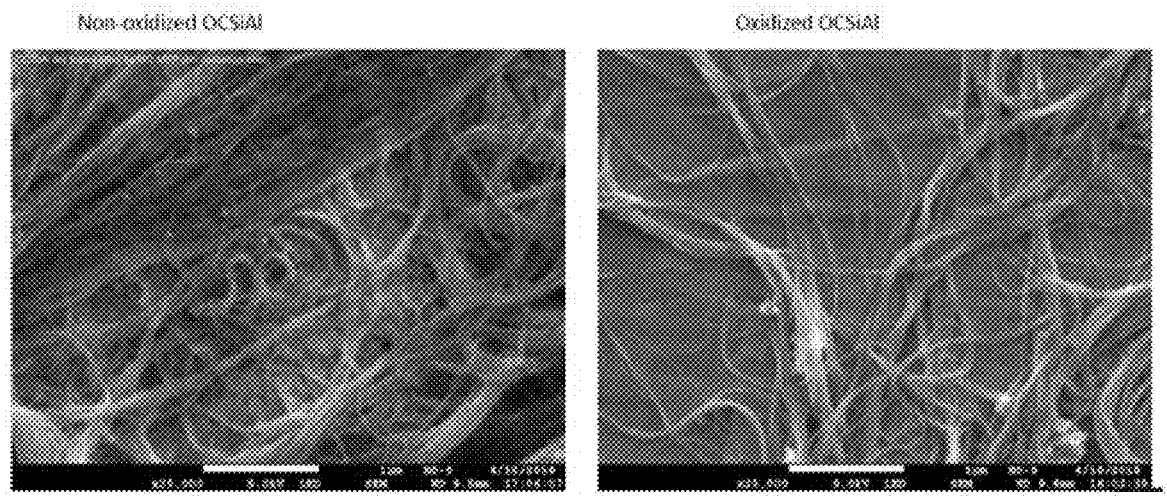

FIGS. 4A and 4B, electron micrographs show side by side comparisons of unoxidized vs. oxidized shear treated OCSiAl. FIG. 4A shows 2,500× magnification while FIG. 4B shows 25,000× magnification. Both levels of magnification show significantly more fibrillation for the oxidized vs. non-oxidized sheared materials.

Figure 5:
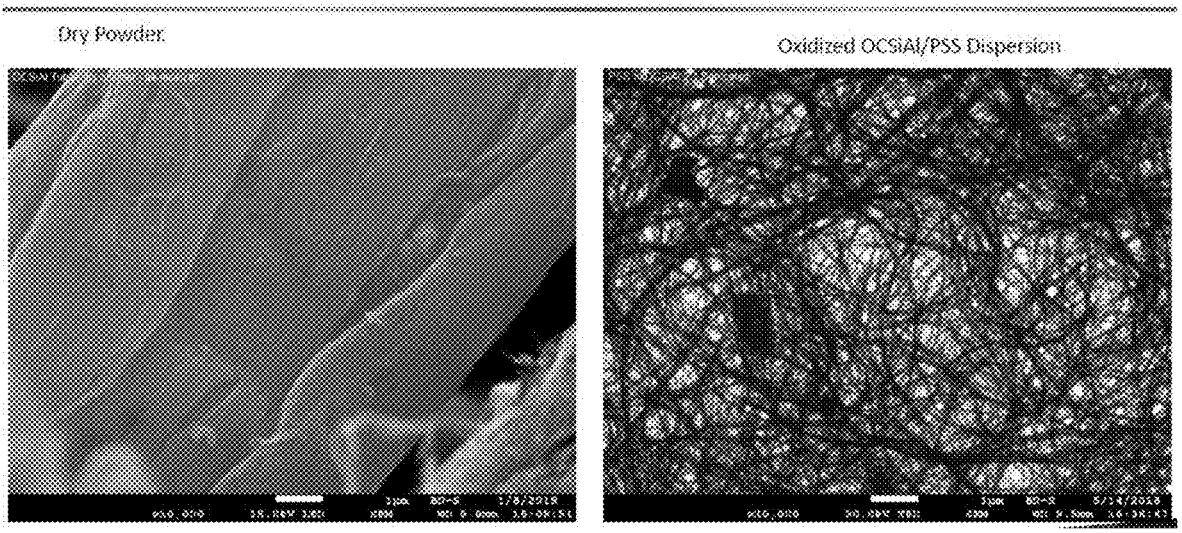
FIG. 5 shows micrographs of dry powder vs. a specific dispersion.
Figure 6:
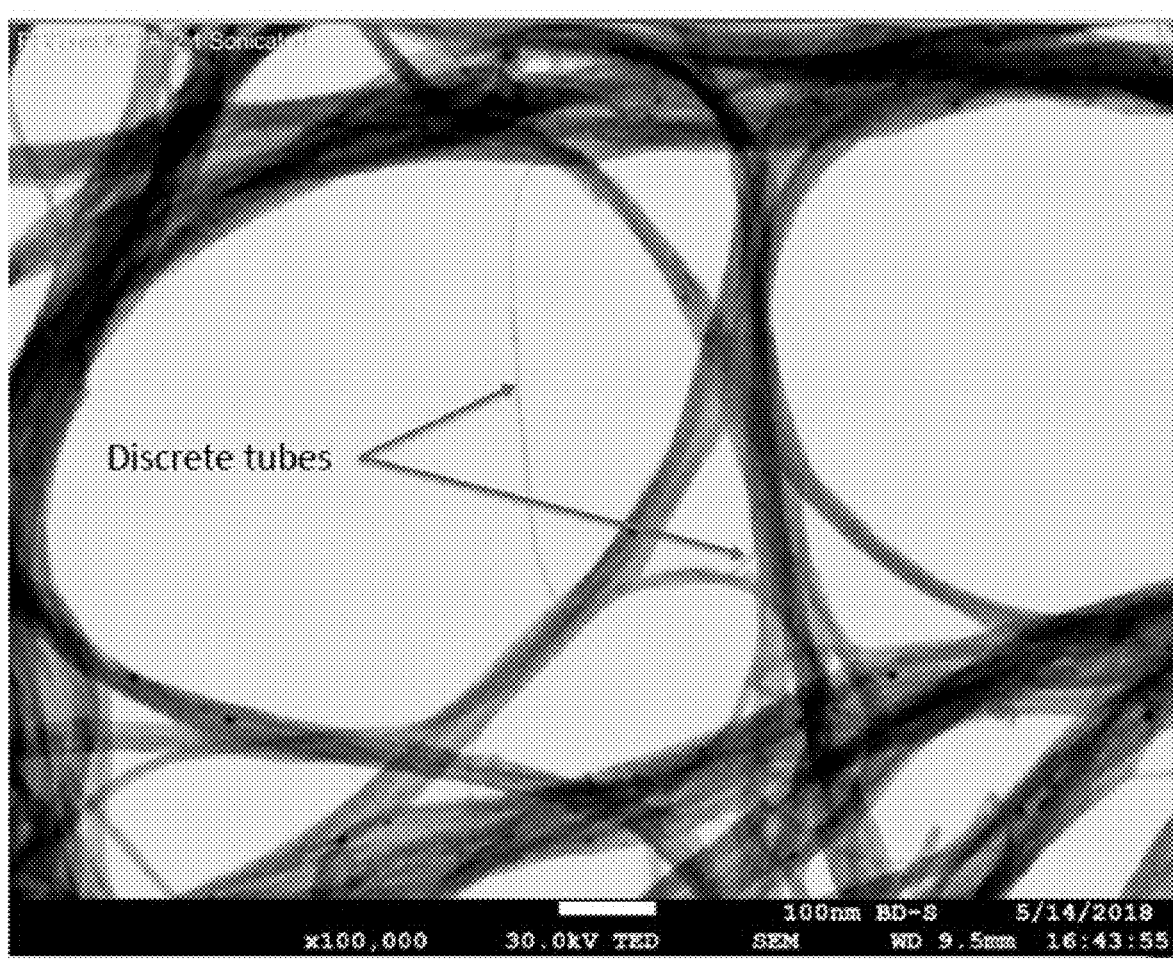
FIG. 6 shows a micrograph of defibrillated ribbons.

FIG. 5 shows a comparison of dry powder OCSiAl vs. PSS (polystyrene sulfonate) dispersion of oxidized OCSiAl FIG. 6 shows that it is possible to get the ribbons defibrillated down to single tubes in some instances.

Figure 7:
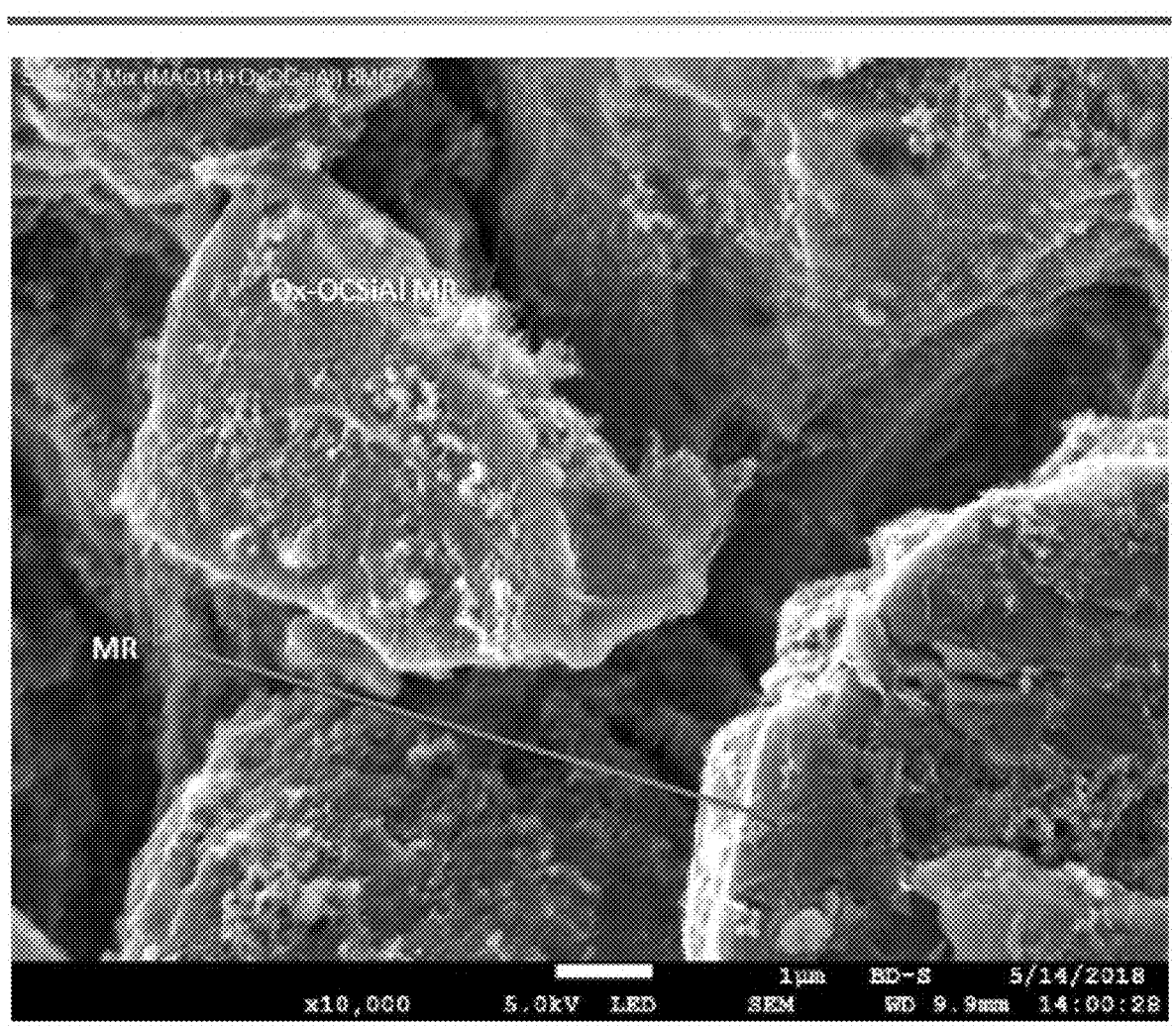
FIG. 7 shows a micrograph of a mixture.

FIG. 7, an electron micrograph, shows oxidized carbon nanotubes and O—OCSiAl mixed and put through a shearing treatment together to make intimate Molecular Rebar® (MR) mixture. This micrograph shows a synergy in that the MR forms a coating on the silicon oxide SiOx particles and interacts intimately with the carbon black while the "tree trunk" Ox-OCSiAl MR is long enough to span the length of the SiOx particle and is long enough to span the gaps that are too large for MR to bridge. FIG. 7 shows the tree trunk covering the entire length of the SiOx particle. Such lengths are easily capable of spanning the gaps between SiOx and graphite. MR particles may be too short to accomplish this but, as shown in FIG. 7, MR particles cover the surface of the SiOx in a "cage type" structure. The oxidized OCSiAl structures are capable of having electroactive material, e.g. Li attached to the functional groups. Electroactive materials include, but are not limited to, graphite, lithium cobalt oxide, lithium iron phosphate, and/or lithium manganese oxide.

Example 4—Electrical Property Testing

Shown in Tables 4 and 5 below is a summary of the readings gathered using a parallel plate apparatus.

TABLE 4

| Sample | | 4.12N load | | | 2.16N Load | | |
|---|---|---|---|---|---|---|---|
| | | Reading ($\Omega$) | Ave ($\Omega$) | SEM ($\Omega$) | Reading ($\Omega$) | Ave ($\Omega$) | SEM ($\Omega$) |
| Bare Cu plates | | 0.0048 | 0.0054 | 0.0006 | 0.0106 | 0.0139 | 0.0017 |
| | | 0.0066 | | | 0.0154 | | |
| | | 0.0048 | | | 0.0157 | | |
| Cu with 2 sided C coat | | 0.971 | 1.083 | 0.172 | 2.315 | 2.045 | 0.188 |
| | | 1.420 | | | 2.138 | | |
| | | 0.857 | | | 1.683 | | |
| Cu with 1 sided C coat | | 0.792 | 0.822 | 0.025 | 0.945 | 1.064 | 0.060 |
| | | 0.872 | | | 1.106 | | |
| | | 0.803 | | | 1.140 | | |
| Cu foil (no C coat) | | 0.272 | 0.478 | 0.128 | 0.808 | 0.879 | 0.042 |
| | | 0.450 | | | 0.874 | | |
| | | 0.712 | | | 0.954 | | |
| Si080-1 | non-Calendered | 1.786 | 1.493 | 0.149 | 2.141 | 1.865 | 0.149 |
| | | 1.296 | | | 1.63 | | |
| | | 1.398 | | | 1.824 | | |
| | Calendered | 0.728 | 0.669 | 0.025 | 0.816 | 0.803 | 0.046 |
| | | 0.642 | | | 0.847 | | |
| | | 0.616 | | | 0.879 | | |
| | | 0.688 | | | 0.671 | | |
| Si080-2 | non-Calendered | 1.425 | 1.464 | 0.044 | 1.932 | 1.959 | 0.108 |
| | | 1.414 | | | 1.788 | | |
| | | 1.552 | | | 2.158 | | |
| | Calendered | 1.043 | 0.889 | 0.059 | 1.276 | 1.130 | 0.095 |
| | | 0.789 | | | 0.863 | | |
| | | 0.802 | | | 1.254 | | |
| | | 0.922 | | | 1.127 | | |
| Si080-3 | non-Calendered | 1.606 | 1.597 | 0.023 | 1.972 | 2.160 | 0.095 |
| | | 1.553 | | | 2.282 | | |
| | | 1.633 | | | 2.226 | | |
| | Calendered | 0.895 | 1.381 | 0.199 | 1.068 | 2.057 | 0.365 |
| | | 1.854 | | | 2.821 | | |
| | | 1.472 | | | 2.092 | | |
| | | 1.301 | | | 2.247 | | |
| Si080-4 | non-Calendered | 1.732 | 1.719 | 0.015 | 2.515 | 2.358 | 0.089 |
| | | 1.735 | | | 2.353 | | |
| | | 1.689 | | | 2.206 | | |
| | Calendered | 1.239 | 1.317 | 0.075 | 2.085 | 1.981 | 0.063 |
| | | 1.278 | | | 1.857 | | |
| | | 1.212 | | | 1.889 | | |
| | | 1.539 | | | 2.093 | | |

TABLE 5

| | | |
|---|---|---|
| Si080-180424-1 | 8x Sheared OxOscial (Sheared) | 0.669 ohms |
| Si080-180424-2 | 8x Sheared Oscial (Non-Ox) (Sheared) | 0.889 ohms |
| Si080-180424-3 | Std + 0.8% Sheared oCNT + 0.02% Tuball ™ | 1.381 ohms |
| Si080-180424-4 | 0.025% Tuball ™ Dispersion | 1.317 ohms |

As can be seen in the data of Tables 4 and 5, the oxidized samples show lower resistance.

Example 5—BET Surface Area Measurement

BET surface area was measured using N2 BET isotherms according to ASTM D6556-16 and the results are provided below.

| Sample | BET Surface Area (m²/g) |
|---|---|
| OCSiAl SWCNT as received | 479.6 |
| OCSiAl SWCNT processed following Example 2 | 757.4 |
| OCSiAl SWCNT oxidized following Example 1 and then processed following Example 2 | 1081.4 |

Example 6—High Purity OCSiAl Tuball SWCNT Through Shearing Device

Figure 8:
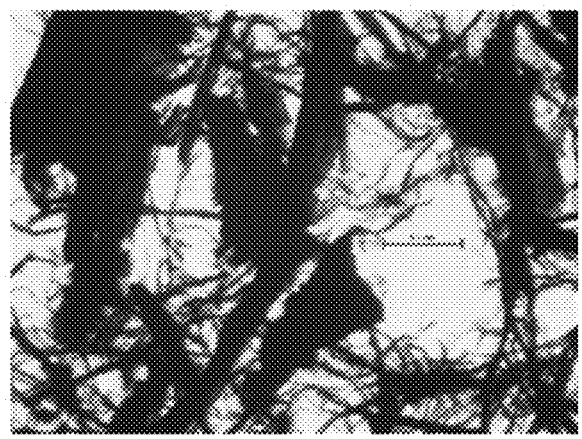
FIG. 8 shows Example 6 nanotubes before shearing.
Figure 9:
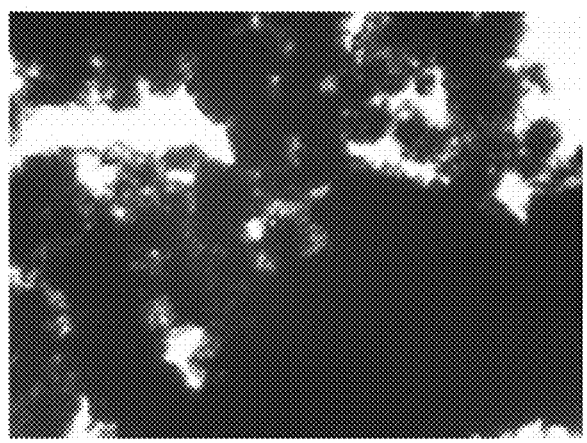
FIG. 9 shows Example 6 nanotubes after shearing.

High purity OCSiAl SWCNT was determined by TGA analysis to have 1.3% oxidation level and 0.6% residuals (metallic impurities) compared to low purity OCSiAl SWCNT which has 0.6% oxidation level and 17.7% Residuals as received. A sample of 2.8 g of high purity OCSiAl SWCNT was diluted with deionized water to 650 g total (0.43% solids) and subjected to 10 minutes of processing using a Rotor Stator. This material was then subjected to shearing force at 2000 psi for a single pass through the device. The pressure was increased to 8000 psi and passed through the shear device an additional 8 times. Optical images after the Rotor Stator vs. the shearing are shown in FIG. 8 which shows high purity OCSiAl SWCNT before shearing and FIG. 9 which shows the high purity OCSiAl SWCNT after extensive shearing. Both FIGS. 8 and 9 are at 112.5× magnification.

Example 7—Oxidation of High Purity OCSiAl Tuball SWCNT

A total of 15 grams of high purity grade OCSiAl SWCNT was added to 35 grams of 65% aqueous nitric acid and heated at 90° C. in a round bottom flask connected to a condenser cooled by deionized water for 5 hours. At 30 minutes and every hour a sample was taken from the flask, washed with deionized water to pH 3.9, and dried. The sample was then analyzed by TGA for oxidation level and residue (metallic impurities.) The results are given in the table below.

Table of TGA results for high purity OCSiAl Tuball SWCNT after oxidation

| Time, Hrs | Oxidation, % | Residue % |
|---|---|---|
| 0.5 | 1.4 | 0.8 |
| 1 | 1.6 | 0.5 |
| 2 | 1.2 | 0.7 |
| 4 | 1.2 | 0.8 |
| 5 | 1.4 | 0.8 |
| Final | 2.0 | 1.0 |

Following the same procedure, a series of different SWCNTs were oxidized, and the oxidation level and residue determined by the same TGA procedure. The starting materials prior to oxidation were also evaluated. The results of these experiments are given in the table below.

Oxidation level and residue level of various SWCNTs before and after oxidation treatment

| Material | % Ox. Range | % Residue Range |
|---|---|---|
| Non-Oxidized 75% purity OCSiAl | 0.9-1.2 | 19-22 |
| Oxidized 75% Purity OCSiAl | 2.3-3.7 | 4.6-10 |
| Non-Oxidized high purity OCSiAl | 1.3-1.4 | 0.6 |
| Oxidized high purity OCSiAl | 2.0 | 1.0 |
| Non-Oxidized Zeon (Aldrich Zeonano) | 0.02 | 1.8 |
| Oxidized Zeon (Aldrich Zeonano) | 4.9 | 0.2 |
| Non-Oxidized Thomas Swan SWCNT (Elicarb) | 1.9 | 2.2 |
| Oxidized Thomas Swan SWCNT (Elicarb) | 3.5 | 1.4 |

Figure 10:
FIG. 10 shows Example 8 nanotubes before shearing.
Figure 11:
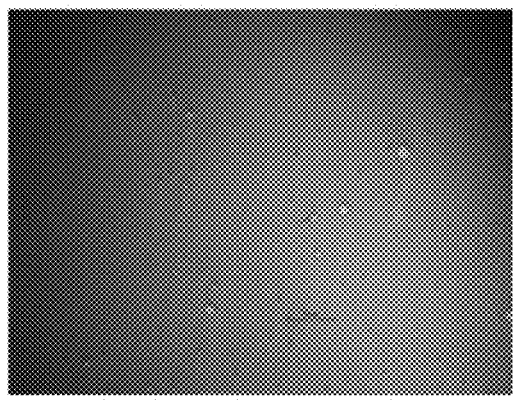
FIG. 11 shows Example 8 nanotubes after shearing.

Example 8—Aqueous Dispersion of High Purity OCSiAl Tuball SWCNT and Sodium Carboxymethyl Cellulose A total of 2 grams of high purity OCSiAl Tuball SWCNT was diluted to 0.4% solids with deionized water. The mixture was subjected to Rotor Stator processing for 5 minutes at 10,000 rpm. The sample was diluted to 0.2% and sheared for 2 passes through the shearing device at 8500-9000 psi. At that point, 105 grams of 3.79% solids Walocel CRT 30 PA sodium carboxymethylcellulose (CMC) in deionized water was added. The mixture was then passed through the shearing device for another 8 passes while keeping the temperature of the mixture below 40° C. Optical microscopy of the SWCNT through the Rotor Stator compared to the final dispersion are shown in FIGS. 10-11. FIG. 10 shows high purity OCSiAl Tuball SWCNT before shearing and FIG. 11 shows high purity OCSiAl Tuball SWCNT after shearing device and addition of CMC. Both are at 11.25× magnification. The lack of any apparent particles in the optical image after dispersion means the fibrils are less than 1 millimeter in size (scale bar is 1 millimeter).

Figure 12:
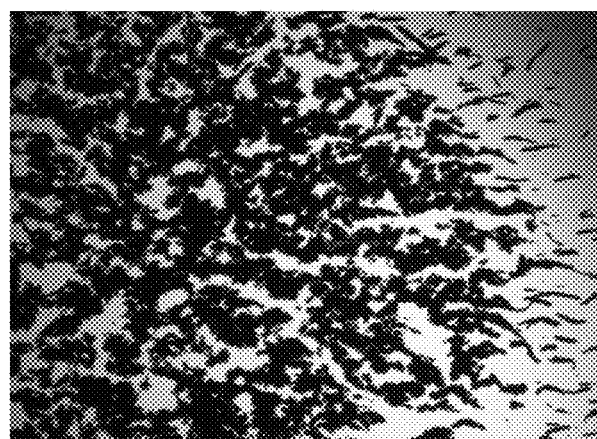
FIG. 12 shows Example 9 nanotubes before shearing.
Figure 13:
FIG. 13 shows Example 9 nanotubes after shearing.

Example 9—Aqueous Dispersion of Oxidized Zeonano SWCNT and Sodium Carboxymethyl Cellulose An aqueous mixture of 0.77% oxidized Zeonano SWCNT in deionized water was processed using a Rotor Stator for 25 minutes at 10,000 rpm. The oxidation was previously described. The mixture was maintained at 27-31° C. during processing. The material was diluted to 0.17% solids. The mixture was passed through a shear device 5 times. The first pass was sheared at 6000 psi and the subsequent passes at 8000-9000 psi. The pH was adjusted to pH 7 after pass 4. After pass 5, Walocel CRT 30 PA sodium carboxymethyl cellulose (CMC) was added in a mass ratio of 1 SWCNT to 1 CMC. The mixture was then passed through the shearing device at 8000-9000 psi for an additional 11 passes while maintaining the temperature of the mixture below 40° C. At pass 14, additional surfactant was added to give a ratio of 1 SWCNT to 2.25 CMC. At pass 16, additional surfactant was added to give a ratio of 1 SWCNT to 2.75 CMC. FIG. 12 shows Oxidized Zeonano SWCNT before shearing and FIG. 13 shows it after shearing device and addition of CMC (11.25× magnification).

Figure 14:
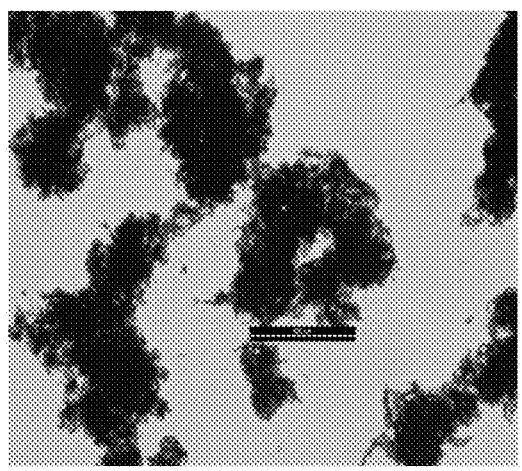
FIG. 14 shows Example 10 nanotubes before shearing.
Figure 15:
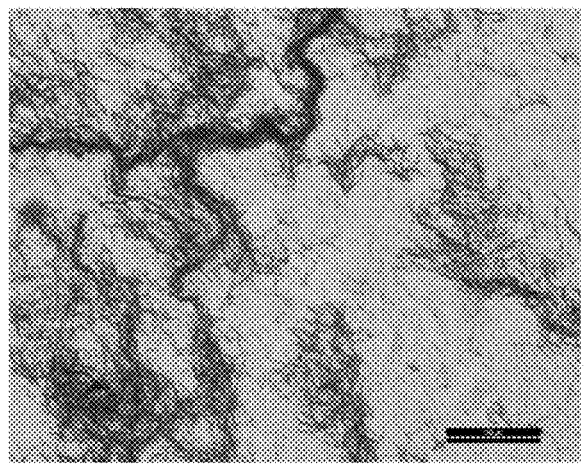
FIG. 15 shows Example 10 nanotubes after shearing.

Example 10—Aqueous Dispersion of Un-Oxidized Zeonano SWCNT and Sodium Carboxymethyl Cellulose A total of 2 grams of un-oxidized, as-received Zeonano SWCNT was mixed with 698 grams of deionized water and processed for 20 minutes using a Rotor Stator at 10,000 rpm. An additional 195 of deionized water was then added. The mixture was passed through the shear device 6 times at 8000-9000 psi. A total of 105.8 grams of 3.78% solids solution of Walocel CRT 30 PA sodium carboxymethyl cellulose was then added to the mixture. The mixture was then passed through the shear device an additional 14 times while maintaining the mixture temperature below 40° C. FIG. 14 shows Un-oxidized Zeonano SWCNT after 5 passes through shearing device (35× magnification) and FIG. 15 shows it after 20 passes through shearing device and addition of CMC (140× magnification)

Example 11—Dispersion of High Purity OCSiAl in CYRENE™ (Dihydrolevoglucosenone)

Figure 16:
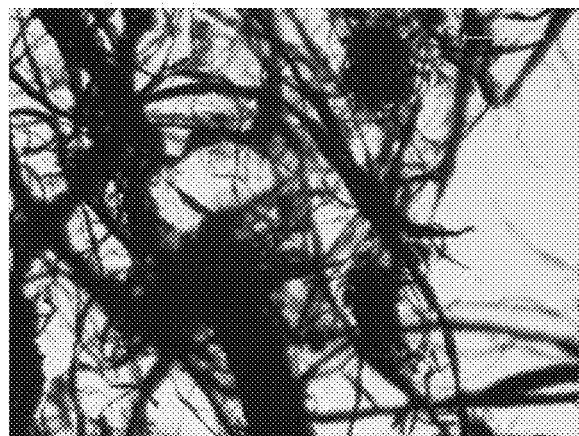
FIG. 16 shows Example 11 nanotubes before shearing.
Figure 17:
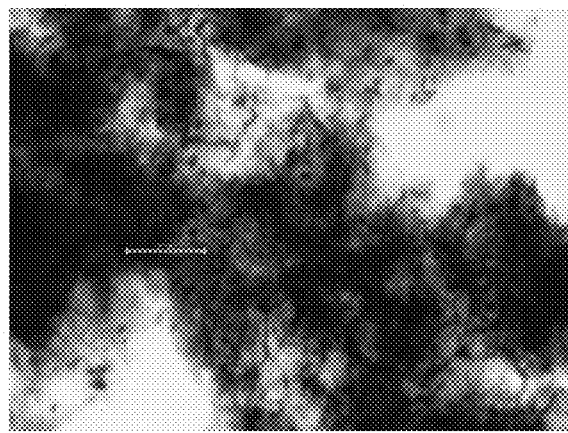
FIG. 17 shows Example 11 nanotubes after shearing.

A concentration of 0.3% high purity OCSiAl was added to CYRENE™ (Dihydrolevoglucosenone) and sonicated in a sonic bath for 150 minutes to create a dispersion of SWCNT in CYRENE™ (Dihydrolevoglucosenone). FIG. 16 shows High purity OCSiAl SWCNT after 30 minutes sonication (169× magnification). FIG. 17 shows High purity OCSiAl SWCNT after 150 minutes sonication (169× magnification).

Example 12

500 grams of >64% nitric acid is heated to 95 degrees C. To the acid, 15 grams of as-received, single-walled carbon nanotubes (Tuball™) are added. The as-received tubes have the morphology of tightly bundled tree-trunks. The mixture of acid and carbon nanotubes are mixed while the solution is kept at about 95 degrees Celcius for 5 hours. At the end of the reaction period, the oxidized carbon nanotubes are filtered to remove the acid and washed with reverse osmosis (RO) water to pH of 4. The wet cake after washing was found to contain 3.6% solids. The resulting carbon nanotubes were determined by thermogravimetry to be oxidized to about 5% by weight and contained about 1.2% by weight of metal oxide residue. Optical microscopy showed the presence of "tree trunks". Experiment 12 in comparison to experiment 1 shows that the average % oxidation level can be controlled by the concentration of carbon nanotubes in the nitric acid.

Experiment 13. Using a Low Energy Intensive Mixer

The intent of experiments 13 and 14 are to demonstrate that a portion of the carbon nanotubes can be made to a different concentration of oxygen containing species attached to the outermost wall of the carbon nanotubes dependent on the degree of fibrillation of the carbon nanotubes in the reactant mixture.

27.5 g of the aqueous wet cake (1 g of carbon nanotubes) from experiment 12 is admixed using an overhead stirrer and a 1 inch diameter 4 blade propellor blade at 280 rpm. with 0.51 g of Jeffamine M2005, (Huntsman Chemical, monoamine terminated polyether of molecular weight average 2000 g/mole) dissolved in 250 ml of ethanol. This gives 34% by weight of Jeffamine M2005 in the mixture of carbon nanotubes and Jeffamine M2005. When the carbon nanotube solution was added in full the rpm of the stirrer was increased to 400 and stirring continued for 1 hour. The carbon nanotubes were then filtered using a Buchner filter and washed four times with 35 ml of ethanol to remove non-coupled Jeffamine M2000. The carbon nanotubes and coupled Jeffamine M2005 was dried in vacuo, first at 90 degrees Celsius to dryness then at 140 degrees Celsius under vacuum to complete the reaction to form amide polyether functionalized carbon nanotubes. Thermogravimetric analysis gave 18.9% weight of oxygenated species on the carbon nanotube.

Experiment 14. Using a High Energy Intensive Mixer

As experiment 13 but the oxidized single wall carbon nanotubes were made up to 0.4% weight (2 g of carbon nanotubes from experiment 12) in a mixture of 50% isopropyl alcohol and 50% water containing 1.5 g of Jeffamine M2005. The mixture was passed through a high mechanical force mixer three times to significantly reduce the number of "tree trunks" seen optically using a microscope, as compared to experiment 13. After filtering, washing with isopropyl alcohol to remove non-coupled Jeffamine M2005 and drying as experiment 13 the thermogravimentric analyses gave the % of oxygenated material as 33% by weight.

Embodiments

1. A composition for use as a binder material, an electrolyte material or a separator film material of an energy storage or collection device, comprising: a plurality of high-surface area carbon nanotubes, wherein at least a portion of the high-surface area carbon nanotubes are open ended.

2. The composition of embodiment 1, wherein the plurality of high-surface area nanotubes are single walled nanotubes.

3. The composition of embodiment 1, further comprising at least one polymer.

4. The composition of embodiment 1, wherein the carbon nanotubes are further functionalized.

5. The composition of embodiment 1, further comprising at least one dispersion aid.

6. The composition of embodiment 3, wherein the polymer is selected from the group consisting of vinyl polymers, poly(styrene-butadiene), partially or fully hydrogenated poly(styrene butadiene) containing copolymers, functionalized poly(styrene butadiene) copolymers such as carboxylated poly(styrene butadiene), poly(styrene-isoprene), poly(methacrylic acid), poly(methylmethacrylate), poly(acrylic acid), poly(vinylalcohols), poly(vinylacetates), fluorinated polymers, polyvinylpyrrolidone, conductive polymers, polymers derived from natural sources, polyethers, polyesters, polyurethanes, and polyamides; homopolymers, graft, block or random co- or ter-polymers, and mixtures thereof.

7. The composition of embodiment 2, further comprising additional inorganic structures comprising elements of the groups two through fourteen of the Periodic Table of Elements.

8. The binder composition of embodiment 2 further comprising carbon structures selected from the group consisting of carbon black, graphite, graphene, oxidized graphene, fullerenes, and mixtures thereof.

9. The composition of embodiment 1, further comprising at least a portion of discrete carbon nanotubes.

10. The composition of embodiment 1, wherein the binder material has an impedance of less than or equal to about one billion ohm-m.

11. The composition of embodiment 1, where the electrolyte material or separator film has a charge transfer resistance of less than or equal to about 10 million ohm-m.

12. An electrode paste for a lead-acid battery comprising: high-surface area carbon nanotubes having an average length from about 1 μm to about 1,500 μm; and a polymer surfactant including polyvinyl alcohol.

13. In a composition comprising a plurality of high-surface area carbon nanotubes, wherein the carbon nanotubes comprise an interior and exterior surface, the improvement comprising: the interior surface comprising an interior surface oxidized species content and the exterior surface comprising an exterior surface oxidized species content, wherein the interior surface oxidized species content differs from the exterior surface oxidized species content by at least 20%, and as high as 100%.

14. The improvement of embodiment 13, wherein the interior surface oxidized species content is less than the exterior surface oxidized species content.

15. The improvement of embodiment 13, wherein the exterior surface oxidized species content comprises from about 1 to about 6 weight percent relative to carbon nanotube weight.

16. The improvement of embodiment 13, wherein the oxygenated species is selected from the group consisting of carboxylic acids, phenols, aldehydes, ketones, ether linkages, and combinations thereof.

17. A composition for use as a binder material, an electrolyte material or a separator film material of an energy storage or collection device, comprising: a plurality of high-surface area carbon nanotube bundles, wherein the high-surface area bundles comprise individual carbon nanotubes, wherein the aspect ratio of the individual nanotubes is between about 700 and about 1,500, and wherein the average length of the high-surface area carbon nanotube bundles is between about 800 microns and about 1,500 microns.

18. The composition of embodiment 17, wherein the nanotubes are oxidized.

19. The composition of embodiment 18, wherein the carbon nanotubes are further functionalized.

20. Yet another embodiment is a composition for use as a cathode material, an anode material, a binder material, an electrolyte material or a separator film material of an energy storage or collection device, comprising: a portion of carbon nanotubes that have a different amount of oxygen containing species than another portion.

21. A further embodiment is the composition of embodiment 20 further comprising a portion of the carbon nanotubes that differ from another portion of carbon nanotubes by an amount of oxygen containing species of at least about 0.2 weight percent.

22. Another embodiment of this invention is a composition for use as a cathode material, an anode material, a binder material, an electrolyte material or a separator film material of an energy storage or collection device, comprising: a portion of carbon nanotubes that have a different type of oxygen containing species than another portion.

23. A yet further embodiment of this invention is the composition of embodiment 22 further comprising a portion of the carbon nanotubes that have a different type of oxygen containing species of not more than 50% by weight of all carbon nanotubes with oxygen containing species.

Specific Embodiments

1. A dispersion comprising:
   oxidized, discrete carbon nanotubes wherein the discrete carbon nanotubes comprise an interior and exterior surface, each surface comprising an interior surface oxidized species content and an exterior surface oxidized species content, wherein the interior surface oxidized species content differs from the exterior surface oxidized species content by at least 20%, and as high as 100%; and
   high-surface area carbon nanotubes, wherein the high-surface area nanotubes are single-wall nanotubes, wherein the BET surface area of the high-surface area nanotubes is from about 550 $m^2/g$ to about 1500 $m^2/g$ according to ASTM D6556-16 and wherein the aspect ratio is at least about 500 up to about 6000;
   wherein the sum of the weight of the oxidized, discrete carbon nanotubes and the high surface area carbon nanotubes is in the range of from about 0.1 to about 30% by weight based on the total weight of the dispersion.

2. The dispersion of embodiment 1, wherein the interior surface oxidized species content of the oxidized, discrete carbon nanotubes is less than the exterior surface oxidized species content.

3. The dispersion of embodiment 1, wherein the interior surface oxidized species content of the oxidized, discrete carbon nanotubes is from about 0.01 to about 3 weight percent relative to carbon nanotube weight.

4. The dispersion of embodiment 1, wherein the discrete carbon nanotubes have an aspect ratio that is bimodal.

5. The dispersion of embodiment 1, further comprising a diluent.

6. The dispersion of embodiment 1, wherein the discrete carbon nanotubes have an aspect ratio of 25 to 500.

7. The dispersion of embodiment 1, further comprising at least one dispersant.

8. The dispersion of embodiment 7, wherein the dispersant is selected from the group consisting of hydrophobic polymers, anionic polymers, non-ionic polymers, cationic polymers, ethylene oxide containing polymers, propylene oxide containing polymers, amphiphilic polymers, fatty acids, CYRENE™ (Dihydrolevoglucosenone), and mixtures thereof.

9. The composition of embodiment 1, wherein at least a portion of the oxidized, discrete carbon nanotubes comprise an oxidation species selected from carboxylic acid or a derivative carbonyl containing species wherein the derivative carbonyl species is selected from ketones, quaternary amines, amides, esters, acyl halogens, and metal salts.

10. The composition of embodiment 1, wherein at least a portion of the oxidized, discrete carbon nanotubes comprise an oxidation species selected from hydroxyl or derived from hydroxyl containing species.

11. The dispersion of embodiment 1, wherein at least a portion of the oxidized, discrete carbon nanotubes comprise multiwall carbon nanotubes.

12. The dispersion of embodiment 1, wherein a portion of high-surface area carbon nanotubes comprise an oxygen containing species.

13. The dispersion of embodiment 1, further comprising at least one polymer.

14. The dispersion of embodiment 1, wherein the polymer is selected from the group consisting of vinyl polymers, poly(styrene-butadiene), partially or fully hydrogenated poly(styrene butadiene) containing copolymers, functionalized poly(styrene butadiene) copolymers such as carboxylated poly(styrene butadiene), poly(styrene-isoprene), poly(methacrylic acid), poly(methylmethacrylate), poly(acrylic acid), poly(vinylalcohols), poly(vinylacetates), fluorinated polymers, polyvinylpyrrolidone, conductive polymers, polymers derived from natural sources, polyethers, polyesters, polyurethanes, and polyamides; homopolymers, graft, block or random co- or ter-polymers, and copolymers and mixtures thereof.

15. The dispersion of embodiment 1, which further comprises a cellulose-based polymer or salt thereof.

16. The dispersion of embodiment 15, wherein the cellulose-based polymer is carboxymethylcellulose or a salt thereof.

17. The dispersion of embodiment 1, wherein the high-surface area carbon nanotubes have an impurity residue of less than about 25 weight percent.

18. The dispersion of embodiment 1, wherein the high-surface area carbon nanotubes have an impurity residue of less than about 12 weight percent.

19. The dispersion of embodiment 1, wherein the high-surface area carbon nanotubes have an impurity residue of less than about 1 weight percent.

20. The dispersion of embodiment 1, wherein the BET surface area of the high-surface area carbon nanotubes is from about 1000 $m^2/g$ to about 1500 $m^2/g$ according to ASTM D6556-16.

The invention claimed is:

1. A dispersion comprising:
oxidized, discrete carbon nanotubes wherein the discrete carbon nanotubes comprise an interior and exterior surface, each surface comprising an interior surface oxidized species content and an exterior surface oxidized species content, wherein the interior surface oxidized species content is in the range of from about 0.01 to about 3 weight percent relative to carbon nanotube weight, wherein the exterior surface oxidized content is from about 0.1 to about 65 weight percent relative to carbon nanotube weight and wherein the interior surface oxidized species content differs from the exterior surface oxidized species content by at least 20% in magnitude; and
high-surface area carbon nanotubes, wherein the high-surface area nanotubes are single-wall nanotubes, wherein the BET surface area of the high-surface area nanotubes is from about 550 $m^2/g$ to about 1500 $m^2/g$ according to ASTM D6556-16 and wherein the aspect ratio is at least about 500 up to about 6000;
wherein the sum of the weight of the oxidized, discrete carbon nanotubes and the high surface area carbon nanotubes is in the range of from about 0.1 to about 30% by weight based on the total weight of the dispersion.

2. The dispersion of claim 1, wherein the interior surface oxidized species content of the oxidized, discrete carbon nanotubes is less than the exterior surface oxidized species content.

3. The dispersion of claim 1, wherein the oxidized, discrete carbon nanotubes have an aspect ratio that is bimodal.

4. The dispersion of claim 1, further comprising a diluent.

5. The dispersion of claim 1, wherein the oxidized, discrete carbon nanotubes have an aspect ratio of 25 to 500.

6. The dispersion of claim 1, further comprising at least one dispersant.

7. The dispersion of claim 6, wherein the dispersant is selected from the group consisting of hydrophobic polymers, anionic polymers, non-ionic polymers, cationic polymers, ethylene oxide containing polymers, propylene oxide containing polymers, amphiphilic polymers, fatty acids, dihydrolevoglucosenone, and mixtures thereof.

8. The dispersion of claim 1, wherein at least a portion of the oxidized, discrete carbon nanotubes comprise an oxidation species selected from carboxylic acid or a derivative carbonyl containing species wherein the derivative carbonyl species is selected from ketones, quaternary amines, amides, esters, acyl halogens, and metal salts.

9. The dispersion of claim 1, wherein at least a portion of the oxidized, discrete carbon nanotubes comprise an oxidation species selected from hydroxyl or derived from hydroxyl containing species.

10. The dispersion of claim 1, wherein at least a portion of the oxidized, discrete carbon nanotubes comprise multi-wall carbon nanotubes.

11. A dispersion comprising:
oxidized, high-surface area carbon nanotubes, wherein the BET surface area of the high-surface area nanotubes comprises from about 550 $m^2/g$ to about 1500 $m^2/g$ according to ASTM D6556-16 and wherein the aspect ratio is at least about 500 up to about 6000 and wherein at least a portion of the high surface area carbon nanotubes are discrete and comprise about 0.1 to about 30% by weight based on the total weight of the dispersion.

12. The dispersion of claim 11, wherein at least a portion of the high-surface area carbon nanotubes comprise single wall carbon nanotubes.

13. The dispersion of claim 1, wherein a portion of high-surface area carbon nanotubes comprise an oxygen containing species.

14. The dispersion of claim 1, further comprising at least one polymer.

15. The dispersion of claim 1, wherein the polymer is selected from the group consisting of vinyl polymers, poly(styrene-butadiene), partially or fully hydrogenated poly(styrene butadiene) containing copolymers, functionalized poly(styrene butadiene) copolymers such as carboxylated poly(styrene butadiene), poly(styrene-isoprene), poly(methacrylic acid), poly(methylmethacrylate), poly(acrylic acid), poly(vinylalcohols), poly(vinylacetates), fluorinated polymers, polyvinylpyrrolidone, conductive polymers, polymers derived from natural sources, polyethers, polyesters, polyurethanes, and polyamides; homopolymers, graft, block or random co- or ter-polymers, and copolymers and mixtures thereof.

16. The dispersion of claim 1, which further comprises a cellulose-based polymer or salt thereof.

17. The dispersion of claim 16, wherein the cellulose-based polymer is carboxymethylcellulose or a salt thereof.

18. The dispersion of claim 1, wherein the high-surface area carbon nanotubes have an impurity residue of less than about 25 weight percent.

19. The dispersion of claim 1, wherein the high-surface area carbon nanotubes have an impurity residue of less than about 12 weight percent.

20. The dispersion of claim 1, wherein the high-surface area carbon nanotubes have an impurity residue of less than about 1 weight percent.

21. The dispersion of claim 1, wherein the BET surface area of the high-surface area carbon nanotubes is from about 1000 $m^2/g$ to about 1500 $m^2/g$ according to ASTM D6556-16.

* * * * *